United States Patent
Moon et al.

(10) Patent No.: US 10,941,048 B2
(45) Date of Patent: Mar. 9, 2021

(54) LIQUID PURIFIER

(71) Applicant: LG ELECTRONICS INC., Seoul (KR)

(72) Inventors: Jungmin Moon, Seoul (KR); Hyoungwon Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/471,676

(22) PCT Filed: Jul. 20, 2017

(86) PCT No.: PCT/KR2017/007842
§ 371 (c)(1),
(2) Date: Jun. 20, 2019

(87) PCT Pub. No.: WO2019/017512
PCT Pub. Date: Jan. 24, 2019

(65) Prior Publication Data
US 2019/0382281 A1 Dec. 19, 2019

(51) Int. Cl.
*C02F 1/00* (2006.01)
*B01D 35/30* (2006.01)
(Continued)

(52) U.S. Cl.
CPC ............. *C02F 1/001* (2013.01); *B01D 35/04* (2013.01); *B01D 35/30* (2013.01); *B67D 1/0004* (2013.01);
(Continued)

(58) Field of Classification Search
CPC .... F25D 31/002; F25D 23/006; F25D 29/005; F25D 31/005; F25D 31/003;
(Continued)

(56) References Cited

U.S. PATENT DOCUMENTS 1,488,696 A * 4/1924 Moffat ................ B01D 36/001
  210/120
3,757,814 A * 9/1973 Hill ........................ F16K 19/00
  137/268
(Continued)

FOREIGN PATENT DOCUMENTS

| CN | 1751637 | 3/2006 |
| CN | 202287795 | 7/2012 |

(Continued)

OTHER PUBLICATIONS

Korean Notice of Allowance dated Dec. 31, 2019 issued in KR Application No. 10-2108-7017529.
(Continued)

*Primary Examiner* — Joseph W Drodge
(74) *Attorney, Agent, or Firm* — Ked & Associates, LLP

(57) ABSTRACT

The present invention relates to a water purifier. In detail, the water purifier includes: a water purifier body including a housing forming an external shape and filters disposed in the housing to filter original water flowing inside from the outside; a dispenser module at least partially protruding forward from the water purifier body and having a dispenser nozzle supplying water passing through the filters to the outside of the water purifier body; and a tray disposed under the dispenser nozzle. The dispenser module is turned to both sides and is moved up/down.

29 Claims, 23 Drawing Sheets

(51) Int. Cl.
*B67D 3/00* (2006.01)
*A47J 31/44* (2006.01)
*B67D 1/00* (2006.01)
*B01D 35/04* (2006.01)
*B67D 1/08* (2006.01)

(52) U.S. Cl.
CPC ......... *B67D 1/0014* (2013.01); *B67D 1/0042* (2013.01); *B67D 1/0859* (2013.01); *B67D 3/0061* (2013.01); *C02F 1/003* (2013.01); *B67D 2210/0001* (2013.01); *B67D 2210/00034* (2013.01); *C02F 2307/10* (2013.01)

(58) Field of Classification Search
CPC ........... F25D 2323/121; F25D 2400/02; F25D 11/00; F25D 17/04; F25D 17/045; F25D 17/047; F25D 23/003; F25D 2323/122; F25D 2339/01; B01D 35/185; B01D 35/1435; B01D 1/28; B01D 5/006; B01D 5/0072; B01D 35/04; B01D 35/14; B01D 1/289; B01D 29/60; B01D 35/02; B01D 35/18; B01D 35/30; B01D 35/305; B01D 2201/04; B01D 2201/0415; B01D 2201/0423; B01D 2201/29; B01D 2201/30; B01D 2201/301; B01D 2201/302; B01D 2201/303; B01D 2201/31; B01D 29/50; B01D 29/56; B01D 29/92; B01D 35/027; C02F 1/003; C02F 1/008; C02F 2209/445; C02F 2209/02; C02F 2307/10; C02F 2201/002; C02F 1/001; C02F 2201/006; C02F 1/002; A47J 31/00; A47J 31/4403; A47J 31/54; B67D 1/12; B67D 2210/0005; B67D 2210/0001; B67D 2210/00031; B67D 2210/00039; B67D 3/00058; B67D 3/0061; B67D 1/0014; B67D 1/0042; B67D 1/0004; B67D 1/0859; B67D 2210/00034; B67D 1/08; B67D 3/0058; F25B 31/00; F25B 31/006; F25B 39/00; F25B 39/02; F25B 39/04; F25B 41/00; F25B 43/00; F25B 43/003; F25B 2339/01; E03C 1/04; E03C 1/0404; E03C 1/0412; E03C 2001/0414; F16K 5/00; F16K 27/00; F16K 27/06; F16K 27/065; F16K 27/12
USPC ........ 137/801; 210/143, 149, 175, 184, 186, 210/232, 435, 449, 483; 62/259.1, 259.4, 62/311, 389; 222/52, 61, 186.06, 189.11, 222/410, 411
See application file for complete search history.

(56) References Cited

U.S. PATENT DOCUMENTS

| | | | | |
|---|---|---|---|---|
| 4,796,521 A * | 1/1989 | Grossi | ............... | A47J 31/3619 99/287 |
| 4,844,796 A * | 7/1989 | Plester | ............... | C02F 9/005 210/100 |
| 5,484,510 A * | 1/1996 | Hartman | ............... | B01D 3/42 202/162 |
| 5,587,055 A * | 12/1996 | Hartman | ............... | C02F 9/005 203/1 |
| 5,776,333 A * | 7/1998 | Plester | ............... | E03B 7/074 210/104 |
| 5,788,840 A * | 8/1998 | Lee | ............... | B67D 1/0861 210/435 |
| 5,858,248 A * | 1/1999 | Plester | ............... | C02F 5/025 210/103 |
| 6,264,830 B1 * | 7/2001 | Plester | ............... | C02F 9/005 210/103 |
| 6,451,211 B1 * | 9/2002 | Plester | ............... | C02F 5/025 210/100 |
| 6,495,049 B1 * | 12/2002 | Van Esch | ............... | C02F 9/005 210/103 |
| 6,640,052 B1 * | 10/2003 | Lao | ............... | B01D 3/42 202/202 |
| 6,739,681 B1 * | 5/2004 | Sharrow | ............... | D06F 34/28 312/327 |
| 6,821,414 B1 * | 11/2004 | Johnson | ............... | C02F 1/008 210/181 |
| 7,294,257 B2 * | 11/2007 | Jackson | ............... | B01D 29/114 210/167.21 |
| 7,645,381 B2 * | 1/2010 | Oranski | ............... | B67D 1/0895 210/198.1 |
| 8,395,334 B2 * | 3/2013 | Eom | ............... | A47B 88/40 318/286 |
| 9,162,158 B2 | 10/2015 | Ba-Abbad | | |
| 9,523,514 B2 * | 12/2016 | Lilley | ............... | F24H 1/0018 |
| 10,053,349 B2 * | 8/2018 | Yoon | ............... | B67D 1/0888 |
| 10,188,972 B2 * | 1/2019 | You | ............... | B01D 29/15 |
| 10,408,533 B2 * | 9/2019 | Kim | ............... | B01D 5/0072 |
| 10,583,380 B2 * | 3/2020 | You | ............... | F25D 23/12 |
| 2003/0015242 A1 * | 1/2003 | Kwak | ............... | B67D 3/0025 137/613 |
| 2003/0057811 A1 * | 3/2003 | Byrne | ............... | D06F 39/12 312/265.6 |
| 2004/0118872 A1 | 6/2004 | Romanyszyn et al. | | |
| 2004/0265151 A1 * | 12/2004 | Bertram | ............... | B29C 44/3442 417/420 |
| 2005/0268638 A1 * | 12/2005 | Voglewede | ............... | F25D 23/126 62/389 |
| 2005/0279689 A1 * | 12/2005 | Oranski | ............... | C02F 9/005 210/198.1 |
| 2006/0065126 A1 | 3/2006 | Turi | | |
| 2006/0070942 A1 | 4/2006 | An | | |
| 2008/0314065 A1 * | 12/2008 | Kim | ............... | F25D 23/028 62/389 |
| 2010/0071401 A1 * | 3/2010 | Jang | ............... | F25D 23/028 62/391 |
| 2010/0175783 A1 * | 7/2010 | Kim | ............... | F25D 23/126 141/198 |
| 2011/0126718 A1 | 6/2011 | Meuer | | |
| 2011/0174162 A1 * | 7/2011 | Ullmann | ............... | A47J 31/4403 99/323.3 |
| 2012/0061382 A1 * | 3/2012 | Yang | ............... | H05B 6/108 219/628 |
| 2012/0222999 A1 * | 9/2012 | Ha | ............... | C02F 1/008 210/175 |
| 2012/0234665 A1 | 9/2012 | Ba-Abbad | | |
| 2012/0296489 A1 * | 11/2012 | Lee | ............... | H02J 3/008 700/297 |
| 2014/0049926 A1 * | 2/2014 | Bas | ............... | H05K 1/00 361/759 |
| 2014/0230481 A1 * | 8/2014 | Yun | ............... | F25D 29/005 62/340 |
| 2014/0239521 A1 * | 8/2014 | Ergican | ............... | B67D 1/0058 261/115 |
| 2015/0048731 A1 * | 2/2015 | Penuel | ............... | F24C 7/085 312/326 |
| 2015/0053715 A1 | 2/2015 | Segiet et al. | | |
| 2015/0300729 A1 * | 10/2015 | Seo | ............... | F25D 23/126 62/126 |
| 2016/0076779 A1 * | 3/2016 | Lee | ............... | F24F 1/10 62/508 |
| 2016/0183716 A1 * | 6/2016 | Harrington | ............... | B01F 15/0212 366/182.2 |
| 2016/0209104 A1 * | 7/2016 | Baek | ............... | B01F 3/04439 |
| 2016/0223247 A1 * | 8/2016 | Yun | ............... | F25C 5/22 |
| 2017/0030006 A1 * | 2/2017 | Lim | ............... | B29C 45/0053 |
| 2017/0050836 A1 * | 2/2017 | Yoon | ............... | B67D 1/0081 |
| 2017/0050837 A1 * | 2/2017 | Kim | ............... | B67D 1/0895 |
| 2017/0153056 A1 * | 6/2017 | Kim | ............... | F25D 23/006 |
| 2017/0172338 A1 * | 6/2017 | Burrows | ............... | A47J 31/3695 |
| 2017/0282105 A1 * | 10/2017 | You | ............... | F25D 23/126 |
| 2017/0320721 A1 * | 11/2017 | Choi | ............... | H05B 6/108 |

(56) References Cited

U.S. PATENT DOCUMENTS

| | | | |
|---|---|---|---|
| 2018/0162712 A1 | 6/2018 | Savese | |
| 2018/0194608 A1* | 7/2018 | Jeon | B67D 1/0888 |
| 2018/0353632 A1* | 12/2018 | Divisi | A61L 2/24 |
| 2019/0016607 A1* | 1/2019 | Jeong | C02F 1/003 |
| 2019/0024962 A1* | 1/2019 | Lee | F25D 23/04 |
| 2019/0218109 A1* | 7/2019 | Jang | C02F 1/003 |

FOREIGN PATENT DOCUMENTS

| | | |
|---|---|---|
| CN | 103968137 | 8/2014 |
| JP | H06-30085 | 4/1994 |
| JP | 2011-115590 | 6/2011 |
| KR | 20-1998-0021895 | 7/1998 |
| KR | 10-2006-0029491 | 4/2006 |
| KR | 10-2006-0048893 | 5/2006 |
| KR | 10-0634782 | 10/2006 |
| KR | 10-2010-0062205 | 6/2010 |
| KR | 10-1381803 | 4/2014 |
| KR | 10-2010-0054580 | 1/2015 |
| KR | 10-2017-0063452 | 6/2017 |
| KR | 10-2017-0063453 | 2/2018 |
| WO | WO 2016/193871 | 12/2016 |

OTHER PUBLICATIONS

International Search Report and Written Opinion dated Feb. 27, 2018 issued in Application No. PCT/KR2017/007842.
Chinese Office Action dated Aug. 11, 2020 issued in CN Application No. 201780087413.X.

* cited by examiner

LIQUID PURIFIER

CROSS-REFERENCE TO RELATED PATENT APPLICATIONS

This application is a U.S. National Stage Application under 35 U.S.C. §371 of PCT Application No. PCT/KR2017/007842, filed Jul. 20, 2017, whose entire disclosure is hereby incorporated by reference.

TECHNICAL FIELD

The present invention relates to a water purifier.

BACKGROUND ART

In general, a water purifier is a machine that removes impurities by filtering water and most water purifiers are for home use.

A home water purifier is connected to a water supply and removes floats or harmful components in piped water, using a filter, and is configured to purify and provide a desired amount of water, depending on operation by a user.

Various products that can not only purify water, but provide hot water and cold water are on the market as home water purifiers. Further, recently, water purifiers that are small in size and can be installed in various installation environments have been developed.

In Korean Patent No. 1381803, there has been disclosed a water purifier having a dispenser unit for dispensing water at the upper end of a main body unit in which the dispenser unit can be separated from the main body unit, can be turned at a set angle, and can be recombined with the main body unit. According to the water purifier having this structure, a user can change the position of the dispenser unit to a set position by separating and recombining again the dispenser unit. Accordingly, it is possible to install the water purifier without a limit in space.

However, the water purifier according to the related art has the following problems.

First, there is inconvenience to separate the dispenser unit from the main body unit, change the position, and then recombine the dispenser unit in order to change the position of the dispenser unit. Further, there is a problem that the joint may be damaged due to repetitive separation and recombination of the dispenser unit.

Second, since the water dispensing tube is connected to the dispenser unit, if the water dispensing tube is damaged while the dispenser unit is separated and recombined, water may leak. Further, when the dispenser unit is repetitively turned, the water dispensing tube or a fitting portion to which the water dispensing tube is connected may be damaged, so water may leak.

Third, the position of the dispenser unit depends on grooves of a coupling hole formed at the main body unit. Accordingly, the dispenser unit can be positioned only at the grooves, so it cannot be positioned at other desired positions.

DISCLOSURE

Technical Problem

An object of the present invention is to provide a water purifier in which the position of a dispenser nozzle combined with a water purifier body can be freely changed up/down and left/right.

Another object is to provide a water purifier in which a dispenser module can be smoothly turned or moved up/down at a predetermined speed to change the position of the dispenser nozzle.

Another object is to provide a water purifier in which the position of the dispenser nozzle can be changed in accordance with various installation environments.

Another object is to provide a water purifier that can prevent water dispensed from the dispenser nozzle from flying out of a cup due to a difference in elevation.

Another object is to provide a water purifier in which a moving case having the dispenser nozzle can be maintained in a fixed case without unexpectedly moving down due to its own weight after the moving case is fully pushed in the fixed case.

Another object is to provide a water purifier in which even if a user takes his/her hand off the moving case having the dispenser nozzle after holding and moving down the moving case to a desired position, the moving case can be fixed at the position.

Another object is to provide a water purifier in which the moving case having the dispenser nozzle can be moved straight up/down.

Another object is to provide a water purifier in which the moving case having the dispenser nozzle can be smoothly moved up/down.

Another object is to provide a water purifier in which the moving case having the dispenser nozzle can be moved up/down accurately to a position that a user wants.

Another object is to provide a water purifier that enables a user to more easily feel up-down movement of the moving case having the dispenser nozzle.

Another object is to provide a water purifier in which deformation such as bending of the fixed case and the moving case is prevented and the cases are firmly combined with each other.

Another object is to provide a water purifier in which the moving case can be moved up/down without shaking forward/rearward or left/right.

Another object is to provide a water purifier in which the moving case and the fixed case are easily combined.

Another object is to provide a water purifier that enables a user to hold and move down the moving case without slip.

Another object is to provide a water purifier in which wear and noise due to friction between the moving case and the fixed case can be reduced.

Another object is to provide a water purifier in which a tray can be turned to a desired position by a user and can be freely separated, thereby improving convenience of use for a user.

Another object is to provide a water purifier having an aesthetic appearance because various components are not exposed to the outside.

Another object is to provide a water purifier that is sanitary and can prevent damage and deformation of the dispenser nozzle.

Another object is to provide a water purifier that allows not only adult users, but short users to see an operation unit because the operation unit is easy to see and that can be easily operated.

Technical Solution

In order to achieve the objects, a water purifier according to an embodiment of the present invention includes: a water purifier body including a housing forming an external shape and filters disposed in the housing to filter original water flowing inside from the outside; a dispenser module at least partially protruding forward from the water purifier body and having a dispenser nozzle supplying water passing through the filters to the outside of the water purifier body; and a tray disposed under the dispenser nozzle, in which the dispenser nozzle includes: a rotator rotatably disposed in the water purifier and rotating with respect to the water purifier body; and a lifter fixed to the outer side of the rotator and changing the height of the dispenser nozzle.

The lifter may include: a fixed case fixed to the outer side of the rotator, having a vertical lifting space therein, and being open at the bottom; a moving case having the dispenser nozzle fixed thereto, disposed in the lifting space of the fixed case, and changing the height of the dispenser nozzle by moving up/down; and a resisting member disposed at the fixed case or the moving case and reducing a force that is applied to the moving case to move up/down the moving case.

The water purifier body may include: a top plate forming the external shape of the top thereof; side panels connected to both ends of the top plate and forming the external shapes of both sides; a front cover forming the external shape of the front side between the side panels and having an opening extending to the front ends of the side panels at both sides; and a filter bracket extending upward from the base to the height corresponding to the opening and supporting the filters, and the rotator may be rotatably disposed on the upper end of the filter bracket and rotated on the filter bracket.

Advantageous Effects

According to the present invention, there are the following effects.

According to the present invention, since it is possible to freely control not only the horizontal position, but the vertical position of the dispenser nozzle for dispensing water, convenience for a user can be improved.

Further, a dispenser module can be smoothly turned or moved up/down at a predetermined speed to change the position of the dispenser nozzle.

Further, the position of the dispenser nozzle can be changed in accordance with various installation environments.

Further, it is possible to prevent water dispensed from the dispenser nozzle from flying out of a cup due to a difference in elevation by freely controlling the height of the dispenser nozzle.

According to the present invention, a moving case having the dispenser nozzle can be maintained in a fixed case without unexpectedly moving down due to its own weight after the moving case is fully pushed in the fixed case.

According to the present invention, even if a user takes his/her hand off the moving case having the dispenser nozzle after holding and moving down the moving case to a desired position, the moving case can be fixed at the position.

According to the present invention, the moving case having the dispenser nozzle can be moved straight up/down.

According to the present invention, the moving case having the dispenser nozzle can be smoothly moved up/down.

According to the present invention, the moving case having the dispenser nozzle can be moved up/down accurately to a position that a user wants.

According to the present invention, a user can more easily feel up-down movement of the moving case having the dispenser nozzle.

According to the present invention, deformation such as bending of the fixed case and the moving case can be prevented and the cases can be firmly combined with each other.

According to the present invention, the moving case can be moved up/down without shaking forward/rearward or left/right.

According to the present invention, the moving case and the fixed case are easily combined.

According to the present invention, a user can hold and move down the moving case without slip.

According to the present invention, wear and noise due to friction between the moving case and the fixed case can be reduced.

According to the present invention, a tray can be turned to a desired position by a user and can be freely separated, thereby improving convenience of use for a user.

According to the present invention, an aesthetic appearance can be achieved because various components are not exposed to the outside.

According to the present invention, the water purifier is sanitary and can damage and deformation of the dispenser nozzle can be prevented.

According to the present invention, not only adult users, but short users can see an operation unit because the operation unit is easy to see and the water purifier can be easily operated.

MODE FOR INVENTION

Figure 1:
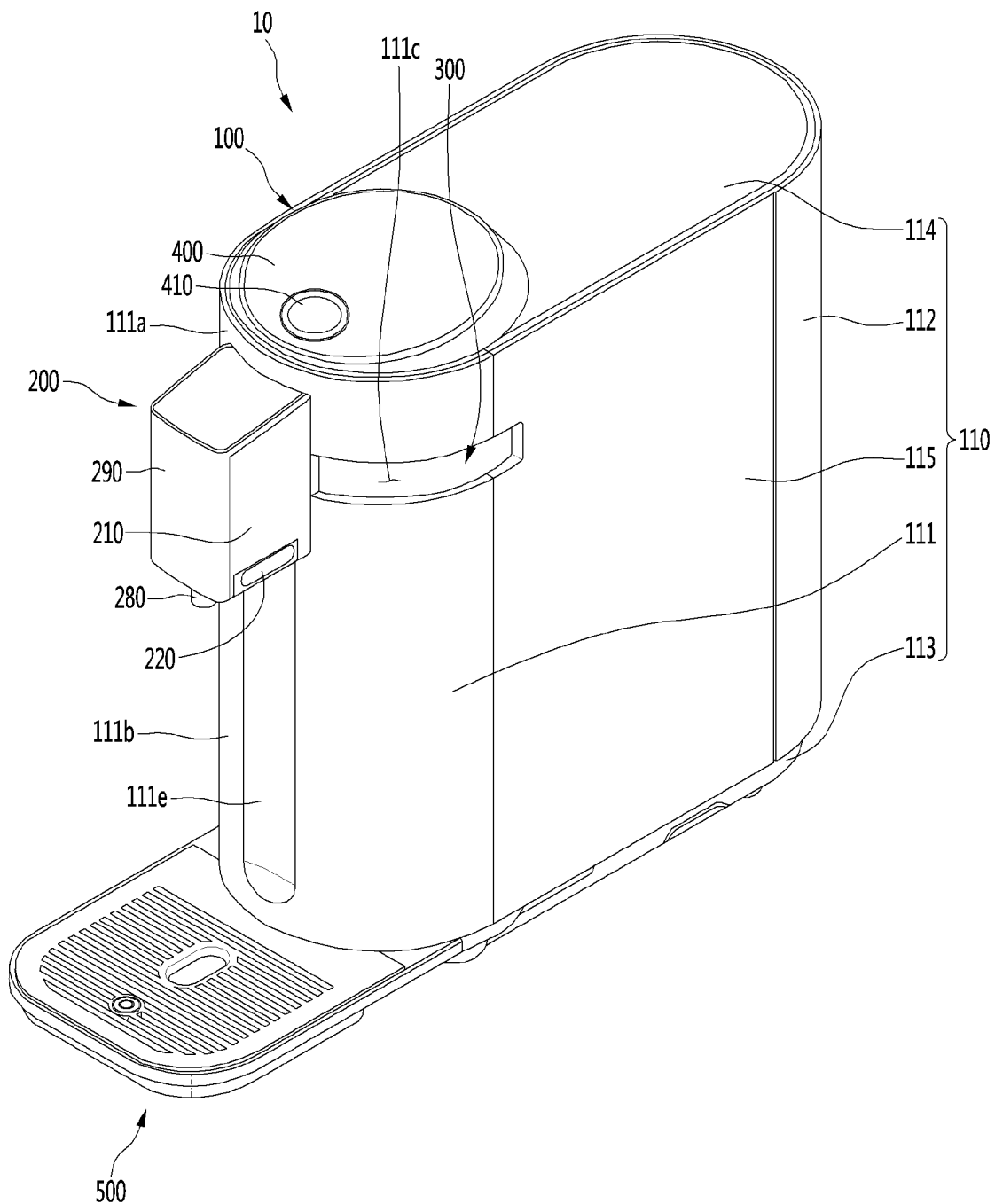
FIG. 1 is a perspective view of a water purifier according to an embodiment of the present invention.

Hereinafter, detailed embodiments of the present invention will be described with reference to the drawings. However, the spirit of the present invention is not limited to the embodiments to be described below, other embodiments can be easily achieved by those skilled in the art within the spirit by adding, changing, removing, and modifying components, and they should be construed as being included in the spirit of the present invention.

The drawings to be referred to in the following embodiments belong to the spirit of the present invention, but detailed parts may be shown different in the drawings for easy understanding without departing from the spirit of the present invention. Further, depending on drawings, specific parts may not be shown or may be exaggerated.

Figure 2:
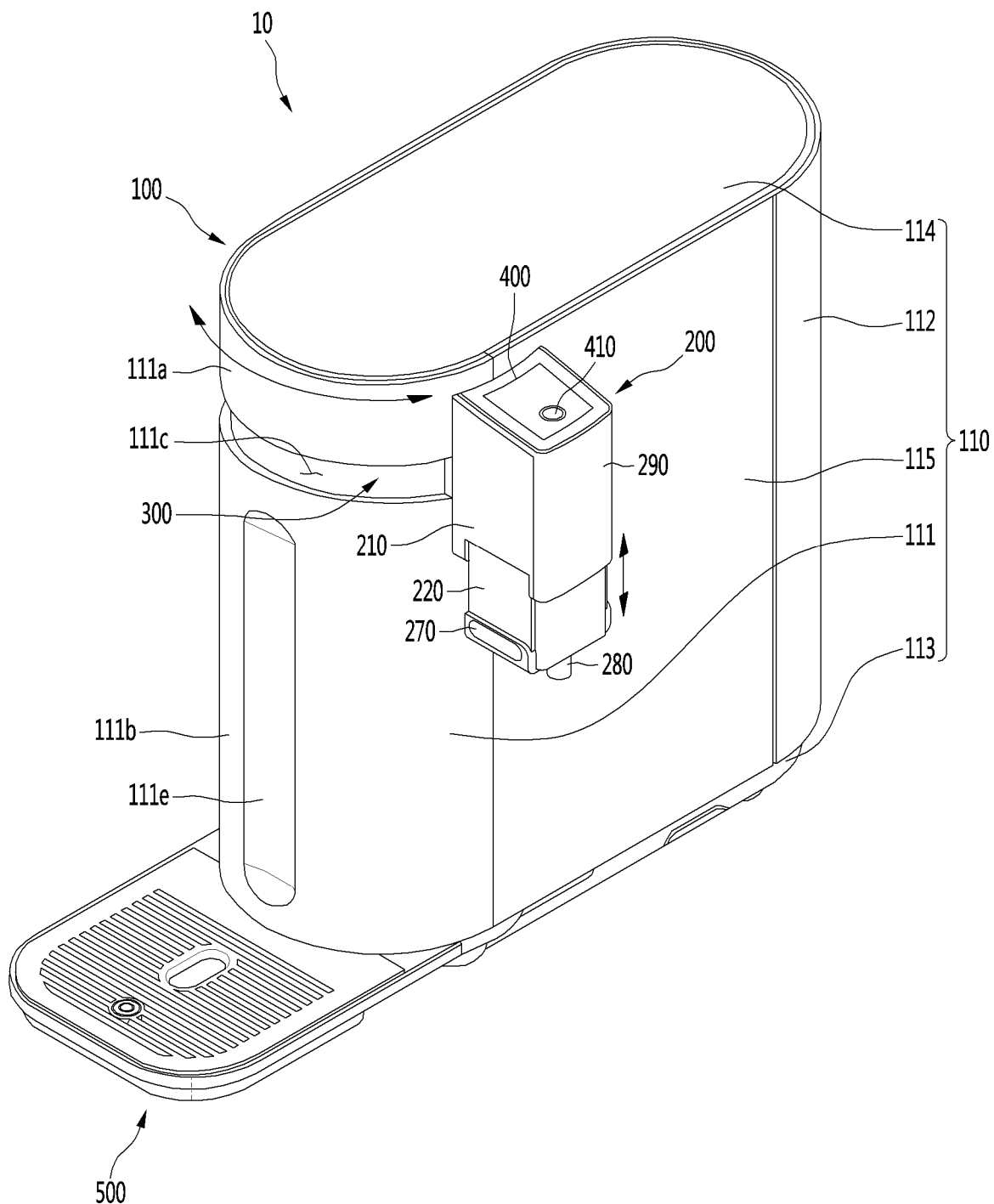
FIG. 2 is a perspective view showing the water purifier according to an embodiment with a dispenser nozzle moved.

FIG. 1 is a perspective view of a water purifier according to an embodiment of the present invention. FIG. 2 is a perspective view showing the water purifier according to an embodiment with a dispenser nozzle moved.

As shown in the figures, a water purifier 10 according to an embodiment is elongated in the front-rear direction with a small left-right width. Accordingly, the entire external shape of the water purifier 10 has a slim and compact shape.

The water purifier 10 according to the present invention may include a water purifier body 100 and a dispenser module 200 disposed on the water purifier body 100 to be horizontally moved left and right or vertically moved up and down.

First, the water purifier body 100 includes a housing 110 and filters 120.

The external shape of the water purifier 1 can be formed the housing 110. The housing 110 is composed of a front cover 111 forming the external shape of the front, a rear cover 112 forming the external shape of the rear, a base 113 forming the bottom, a top cover 114 forming the top, and side panels 115 forming left and right sides, respectively. The external shape of the water purifier 10 can be formed by assembling the front cover 111, the rear cover 112, the base 113, the top cover 114, and the pair of side panels 115.

The front and rear ends of the base 113 and the top cover 114 may be rounded, and the front cover 111 and the rear cover 112 may be formed convexly forward and rearward to have curvature corresponding to the round front ends and rear ends of the base 113 and the top cover 114.

The filters 120 that purify and discharge original water flowing inside from the outside are disposed in the housing 110.

The dispenser module 200 is disposed on the front side of the water purifier body 100. The dispenser module 200 protrudes forward from the front cover 111 and provides purified water through a dispenser nozzle 280 protruding downward.

The front cover 111 may be composed of an upper cover 111a and a lower cover 111b. The upper cover 111a and the lower cover 111b are vertically spaced from each other, thereby forming an opening 111c. The opening 111c can be closed by a rotator 300 rotatably disposed on the water purifier body 100.

A flat seat 111e may be vertically formed at the center of the lower cover 111b.

When the flat seat 111e is formed on the lower cover 111b, as described above, a user can push a container such as a cup deeper to catch water and a container such as a cup can be stably supported, as compared with a case in which the entire lower cover 111b is formed convexly forward.

Further, it is possible to align the dispenser module 200 with the center on the basis of the flat seat 111e when turning the dispenser module 200.

For reference, when the dispenser module 200 have been turned left or right, a container such as a cup can be stably supported by the flat side panels 115.

The dispenser module 200 can be turned with the rotator 300. Accordingly, a user can turn the dispenser module 200 at desired angles, depending on the installation state or the installation environment of the water purifier 10.

For example, an operation unit 400 having a dispenser button 410 is disposed at the front portion of the top cover 114 and can be rotated with the dispenser module 200.

Alternatively, the operation unit 400 may be disposed not at the water purifier body 100, but at the dispenser module 200.

In this case, it is preferable that the dispenser button 410 of the operation unit 400 is disposed on the top of the dispenser module 200. If the dispenser button 410 is disposed on the front side of the dispenser module 200, horizontal force is applied to the dispenser module 200 when a user presses the dispenser button 410, so the dispenser module 200 may be unintentionally turned. However, when the dispenser button 410 is disposed on the top of the dispenser module 200, vertical force is applied to the dispenser module 200 when a user presses the dispenser button 410, so the dispenser module 200 is not unintentionally turned. Accordingly, when the dispenser button 410 is provided at the dispenser module 200, the dispenser button 410 should be disposed on the top of the dispenser module 200.

Alternatively, the operation unit 400 may be provided on both of the top cover 114 of the water purifier body 100 and the top of the dispenser module 200.

The dispenser module 200 includes a lifter fixed to the outer side of the rotator 300 and changing the height of the dispenser nozzle. The height of the dispenser nozzle 280 can be changed by the lifter.

Turning and moving-up/down of the dispenser module 200 will be described below.

Figure 3:
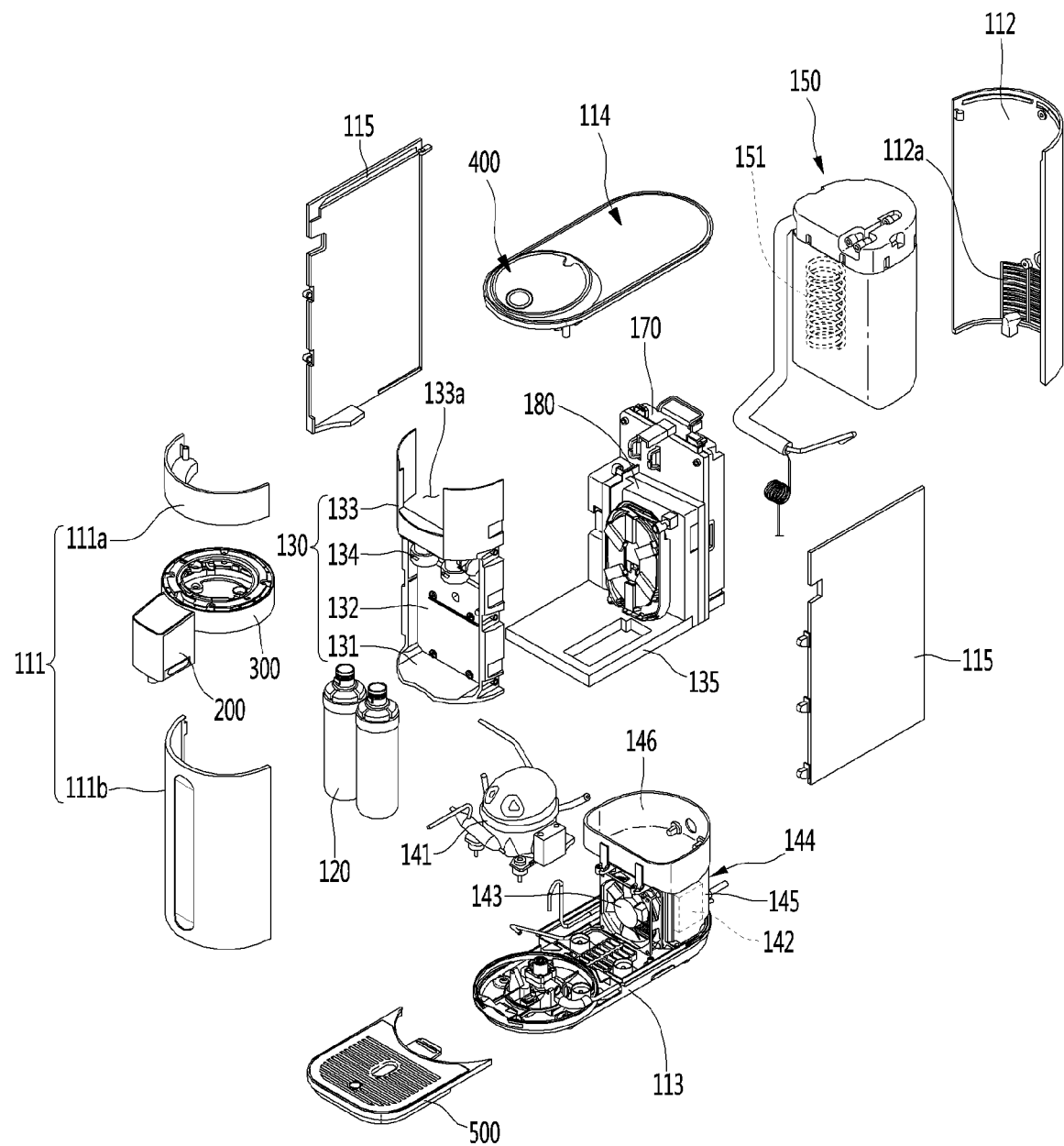
FIG. 3 is an exploded perspective view of the water purifier according to an embodiment of the present invention.

FIG. 3 is an exploded perspective view of the water purifier according to an embodiment of the present invention.

The filters 120 for purifying water and a filter bracket 130 to which several valves are coupled are disposed in the housing 110.

The filter bracket 130 may have a tongue 131 coupled to the base 113, a filter seat 132 where the filters 120 are received, and a rotator seat 133 where the rotator 300 is disposed.

In detail, the tongue 131 is formed to correspond to the shape of the front end of the base 113 and is coupled to the base 113. By coupling the tongue 131, the filter bracket 130 can be fixed in position and the bottom of the filter seat 132 can be formed.

The filter bracket 130 can be locked to the base 113 in a hooking type or may be fixed by screws tightened through the bottom of the base 113.

The filter seat 132 is a space vertically elongated and recessed rearward (to the right in the figure) from the front (the left in the figure) to be able to receive the filters 120. The filters 120 can be disposed on the filter seat 130. The filters 120, which are provided to purify original water (piped water), can be achieved by combining filters having various functions.

Filter sockets 134 for fixing the filters 120 may be provided at the filter seat 130. Pipes for delivering purified water are disposed in the filter sockets 134 and the pipes may be connected with several valves (not shown). Accordingly, original water can flow toward a supply valve (not shown) after sequentially flowing through the filters 120.

Several valves (not shown) may be disposed on the rear side (right side in the figure) of the filter seat 132. The valves (not shown) are provided to selectively supply purified water, cold water, and hot water to a cooling tank 150, an induction heating assembly 160, and the dispenser module 200, in addition to the filters 120.

A rotator seat 133 on which the rotator 300 is rotatably disposed is formed on the top of the filter seat 132.

The rotator seat 133 may be formed to have curvature corresponding to the curvature of the front cover 111 covering the front of the rotator seat 133. The top of the filter bracket 130 can be covered by the top cover 114.

Further, the operation unit 400 may be disposed over the rotator 300 and is coupled to the rotator 300, so the operation unit 400 can be rotated together with the rotator 300 when the rotator 300 is rotated.

A compressor 141 and a condenser 142 are disposed on the base 113. Further, a cooling fan 143 is disposed between the compressor 141 and the condenser 142 to be able to cool the compressor 141 and the condenser 142. The compressor 141 may be an inverter type compressor of which the cooling ability can be controlled by changing the frequency. Accordingly, purified water can be efficiently cooled, and accordingly, power consumption can be reduced.

Further, the condenser 142 may be disposed at a rear portion on the base 113 to correspond to an outlet 121a formed through the rear cover 112. The condenser 142 may be formed by bending a flat tube type of refrigerant pipe several times to efficiently use the space and improve heat exchange efficiency and can be received in a condenser bracket 144.

The condenser bracket 144 has a condenser mount 145 to which the condenser 142 is fixed and a tank mount 146 on which a cooling tank 150 for producing cold water can be disposed. The condenser mount 145 forms a space corresponding to the entire shape of the condenser 142 to be able to receive the condenser 142. Further, the condenser mount 145 is open at the sides facing the cooling fan 143 and the outlet 121a, so the condenser 142 can be effectively cooled.

Further, the tank mount 146 is formed at the upper portion of the condenser bracket 144, that is, on the condenser mount 145. The cooling tank 150 is fixed with the lower end inserted in the tank mount 146.

The cooling tank 150, which is provided to produce cold water by cooling purified water, is filled with cooling water that exchanges heat with purified water that flows inside. Further, an evaporator 151 for cooling the cooling water may be disposed in the cooling tank 150. Further, purified water can flow through the cooling tank to be able to be cooled.

A support plate 135 extending toward the cooling tank 150 is disposed at a side of the filter bracket 130. The support plate 135 is positioned over the compressor 141 and extends from the filter bracket 130 to the condenser bracket 144, thereby providing a space for mounting a heating/control module 160, 170.

The heating/control module 160,170 may be composed of an induction heating assembly 160 for producing hot water and a control assembly 170 for controlling the general operation of the water purifier 10. The induction heating assembly 160 and the control assembly 170 can be combined in a single module and can be disposed on the support plate 135 in the combined state.

The induction heating assembly 160, which is provided to heat purified water, may use induction heating (IH) for heating. The induction heating assembly 160 can immediately and quickly heat water when hot water is required, and it can provide hot water at a desired temperature to a user by heating purified water by controlling output of a magnetic field. Accordingly, it is possible to provide hot water at a desired temperature in accordance with operation by a user.

The control assembly 170, which is provided to control the operation of the water purifier 10, can control the compressor 141, the cooling fan 143, various valves and sensors, and the induction heating assembly 160 etc. The control assembly 170 can be modulated by combining a plurality of PCBs separated in accordance with the functions. Further, when the water purifier 10 provides only cold water and purified water, the PCB for controlling the induction heating assembly 160 may be removed, and one or more PCBs can be removed in this way.

Main components of the water purifier are described hereafter in more detail with reference to the drawings.

The dispenser module 200 includes the rotator 300 rotatably disposed on the water purifier body 100 to rotate in two directions with respect to the water purifier body 100 and the lifter fixed to the outer side of the rotator 300 to change the height of the dispenser nozzle 280.

The lifter and the rotator 300 may be integrated or may be separably combined.

The rotator 300 is described hereafter.

Figure 4:
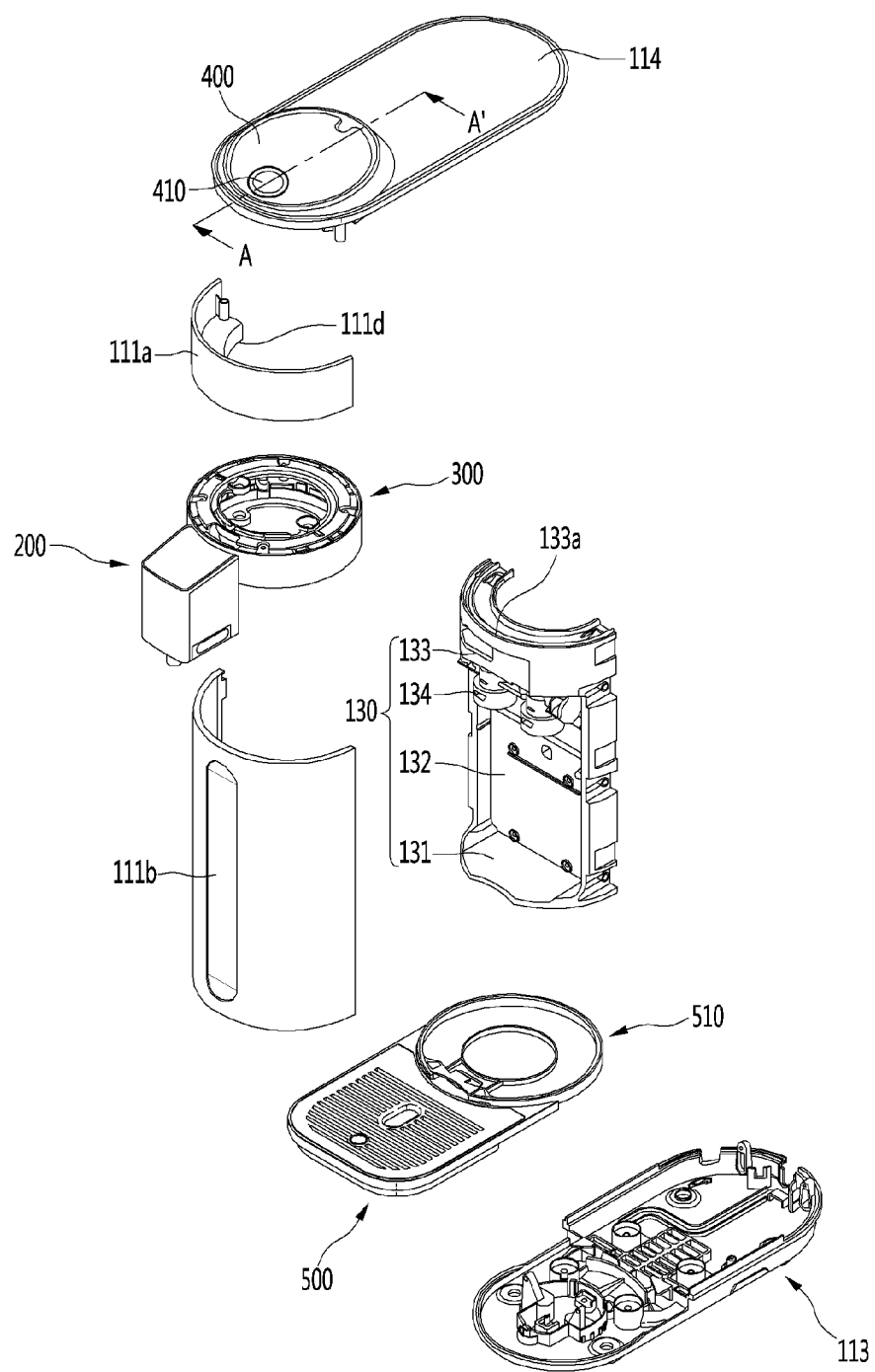
FIG. 4 is an exploded perspective view showing some of the components shown in FIG. 3.

FIG. 4 is an exploded perspective view showing some of the components shown in FIG. 3.

Referring to FIG. 4, the filter bracket 130 may have the tongue 131 coupled to the base 113, the filter seat 132 where the filters 120 are received, and the rotator seat 133 where the rotator 300 is disposed.

In detail, the tongue 131 is formed to correspond to the shape of the front end of the base 113 and is coupled to the base 113. By coupling the tongue 131, the filter bracket 130 can be fixed in position and the bottom of the filter seat 132 can be formed.

The filter bracket 130 can be locked to the base 113 in a hooking type or may be fixed by screws tightened through the bottom of the base 113. The tongue 131 can be combined with the base 113 within the inside of a rotary ring 510 without interference with the rotary ring 510 so that a tray 500 can be smoothly rotated.

The filters 120 are disposed on the filter seat 132.

The rotator seat 133 is formed on the top of the filter seat 132. The rotator seat 133 has a semicircular shape protruding forward with predetermined curvature and has a structure on the top where the rotator 300 can be seated. The rotator seat 133 may be formed to have curvature corresponding to the outer side of the rotator 300. Accordingly, the rotator 300 can be rotated on the rotator seat 133.

An internal gear 133a may be formed on the top of the rotator seat 133. The internal gear 133a has curvature corresponding to the rotator seat 133 and is in mesh with a pinion gear 371 to be described below so that the rotator 300 can be smoothly rotated.

The rotator 300 is formed in a circular shape and the dispenser module 200 protrudes forward from the rotator 300. The dispenser module 200 may be integrated with the rotator 300, so it can be turned with the rotator 300 when the rotator 300 is rotated.

The upper cover 111a may be disposed over the rotator 300. The upper cover 111a forms the front external shape of the water purifier 10 together with the lower cover 111b covering the front of the filter bracket 130. Accordingly, the upper cover 111a is rounded to form a portion of the front external shape of the water purifier between the rotator 300 and the top cover 114.

The top cover 114 may be disposed on the upper cover 111a. The top cover 114 forms the top of the water purifier 10. The operation unit 400 is disposed on the top cover 114. The operation unit 400 is formed in a circular shape and is combined with the rotator 300 to be able to rotate with the rotator 300 when the rotator 300 is rotated. The dispenser button 410 is provided at the operation unit 400.

In an embodiment, the operation unit 400 is formed in a circular shape and the top of the operation unit 400 inclines downward as it goes to the dispenser module 200.

Accordingly, it is easy to operate the operation unit 400 and a user can easily operate and see the operation unit 400.

Figure 5:
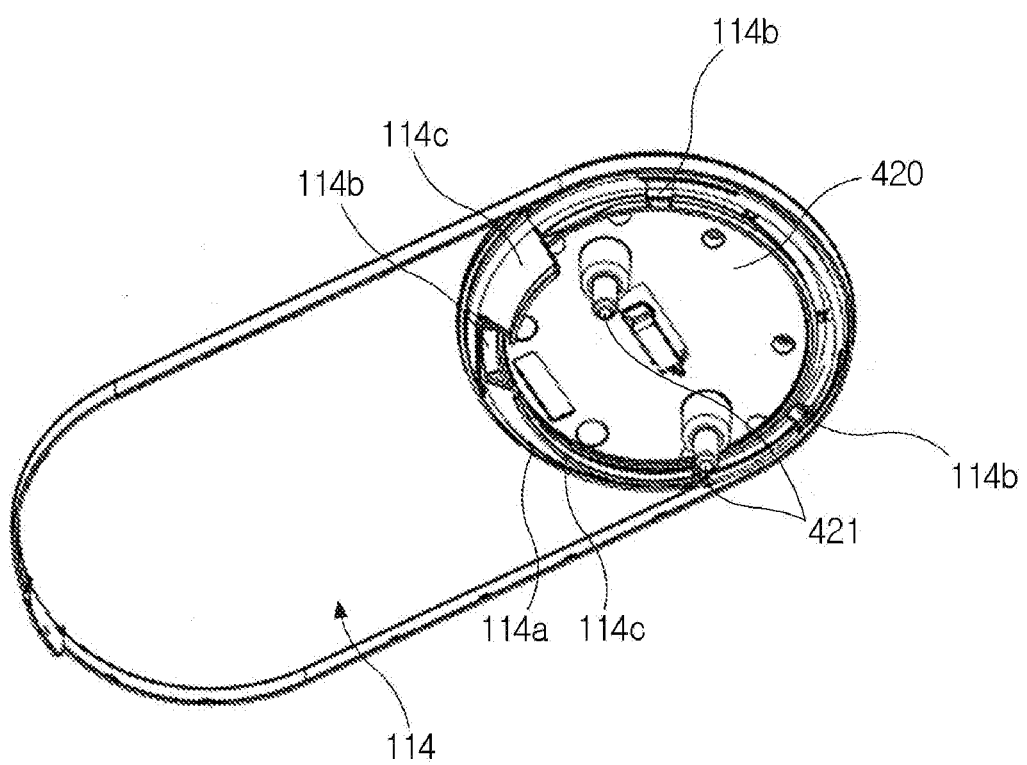
FIG. 5 is a bottom perspective view showing an operation unit and a top cover combined with each other.
Figure 6:
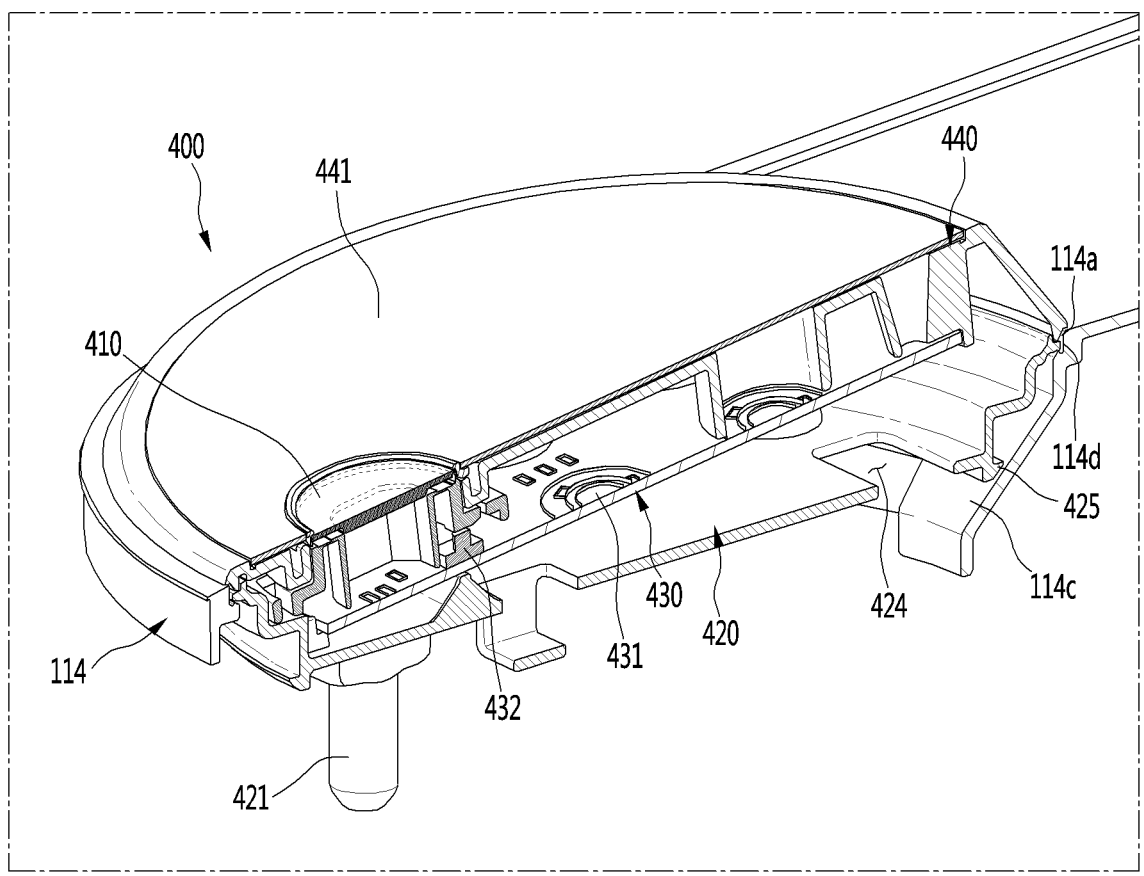
FIG. 6 is a cross-sectional view taken along line A-A' of FIG. 4.

FIG. 5 is a bottom perspective view showing the operation unit and the top cover combined with each other. FIG. 6 is a cross-sectional view taken along line A-A' of FIG. 4.

As shown in the figures, the top cover 114 forms the top of the water purifier 10. The top cover 114 is rounded at the front end and the rear end and is combined with the front cover 111 and the rear cover 112. The top cover 114 may be formed to have curvature corresponding to the upper ends of the front cover 111 and the rear cover 112.

The a cover hole 114a is formed at the top cover 114. The cover hole 114a is formed to have a size and a shape that correspond to the operation unit 400 so that the operation unit 400 can be rotatably disposed.

Base holders 114b and base supports 114c for fixing an operation unit base 420 forming the bottom of the operation unit 400 may be formed inside the cover hole 114a.

The base holders 114b may extend toward the center of the cover hole 114a from the cover hole 114a and are arranged with regular intervals. The base holders 114b are bent inward at the ends to press and fix the edge of the operation unit base 420.

The base supports 114c extend inward at the rear portion of the cover hole 114a. The base supports 114c incline downward toward the center of the cover hole 114a to be able to support the bottom of the operation unit base 420. A protrusion 425 having a slope corresponding to the base supports 114c is formed around the edge of the operation unit base 420. Accordingly, the base supports 114c and the protrusion 425 can be in contact with each other, so the operation unit 400 can be stably supported even though it is rotated.

A stepped portion 114d is formed around the cover hole 114a so that the edge of the operation unit 400 is seated thereon. Accordingly, the operation unit 400 can be additionally supported, so the operation unit 400 can be stably rotated.

The operation unit 400 may include the operation unit base 420, an operation unit PCB 430, and an operation unit cover 440. The operation unit base 420 forms the bottom external shape of the operation unit 400 and is seated in the cover hole 114a, so the operation unit 400 is rotatably supported on the top cover 114.

The operation unit base 420 may have the same diameter as the cover hole 114a. The edge of the operation unit base 420 may extend upward and is combined with the operation unit cover 440, thereby forming a space therein.

Rotational coupling portions 421 extending downward may be further formed at two sides on the bottom of the operation unit base 420. The rotational coupling portion 421 can be coupled to the rotator 300, so the rotator 300 and the operation unit 400 can coupled to each other to be able to rotate together.

A wire hole 424 for passing a wire connected to the operation unit PCB 430 may be formed through the bottom of the operation unit base 420.

The operation unit cover 440 is formed such that the front end is lower than the rear end with the top 441 inclined. The slope of the top 441 of the operation unit cover 440 corresponds to the slope of the operation unit PCB 430, whereby it is possible to more conveniently operate a touch sensor 431 and a switch 432 and a user can more easily operate and see the operation unit.

Figure 7:
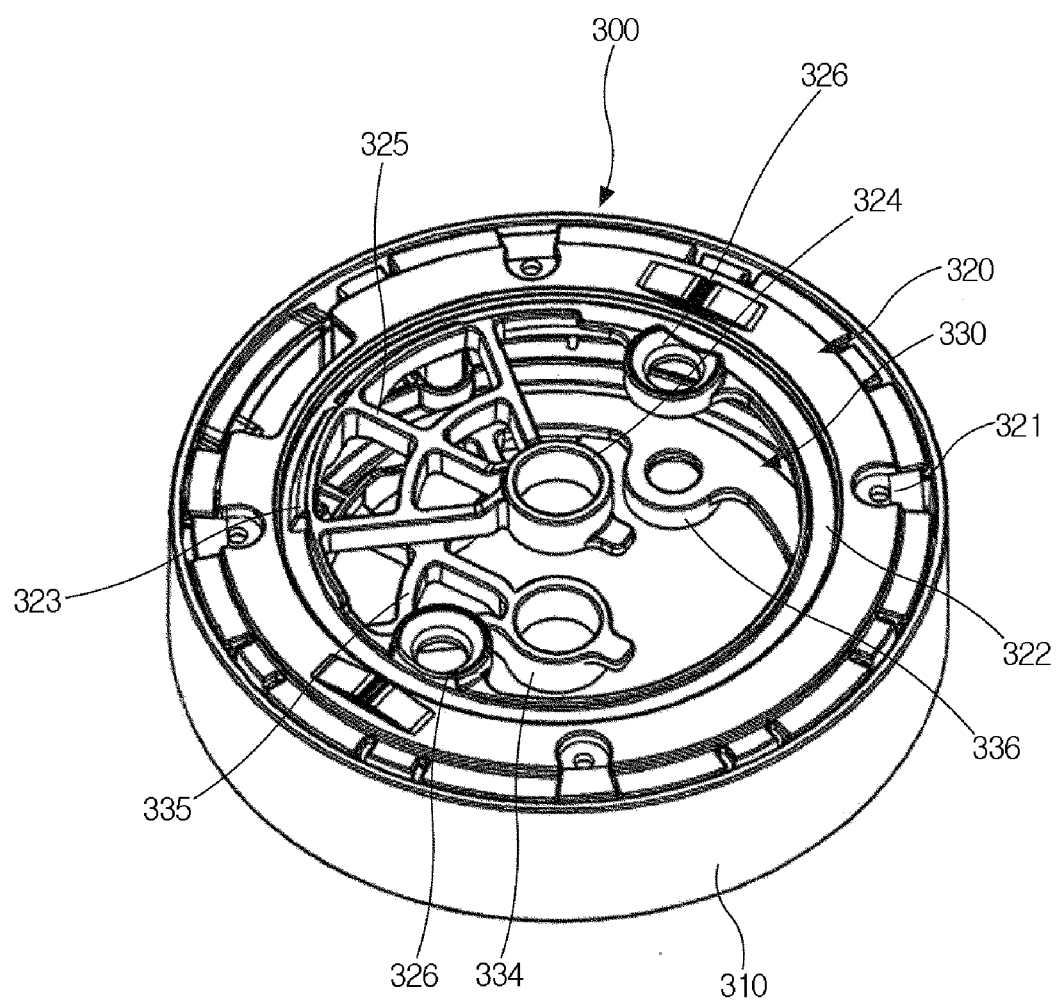
FIG. 7 is a top perspective view of a rotator of the water purifier.
Figure 8:
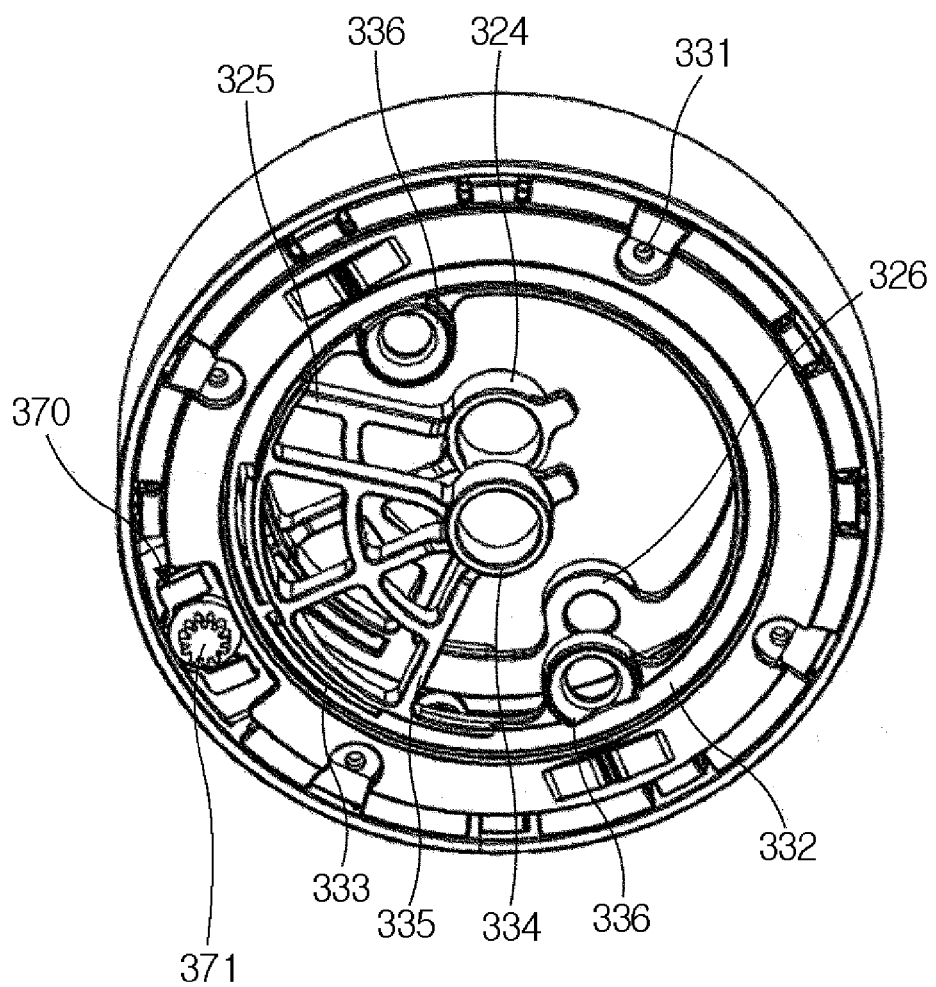
FIG. 8 is a bottom perspective view of the rotator.
Figure 9:
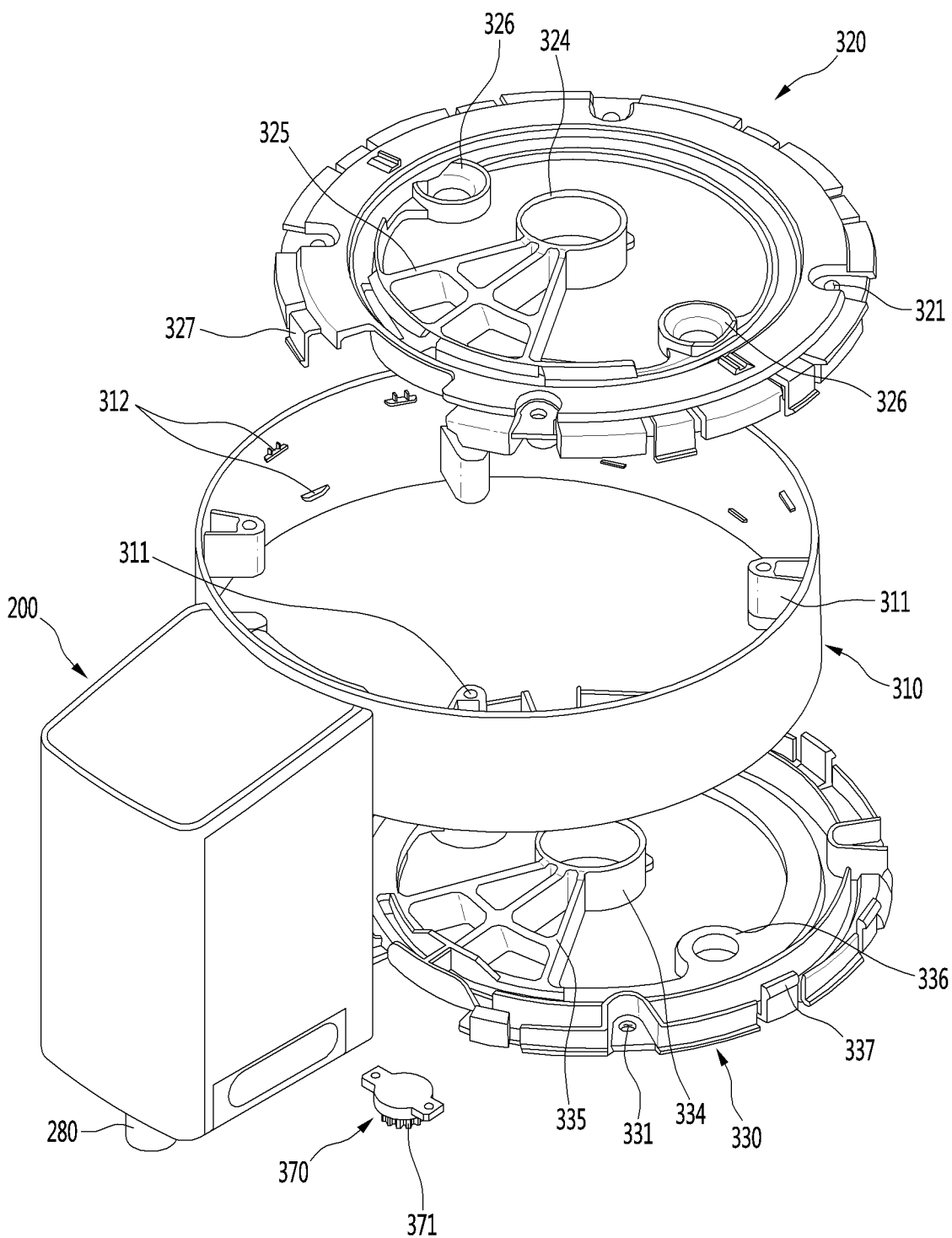
FIG. 9 is an exploded perspective view of the rotator of the water purifier.
Figure 10:
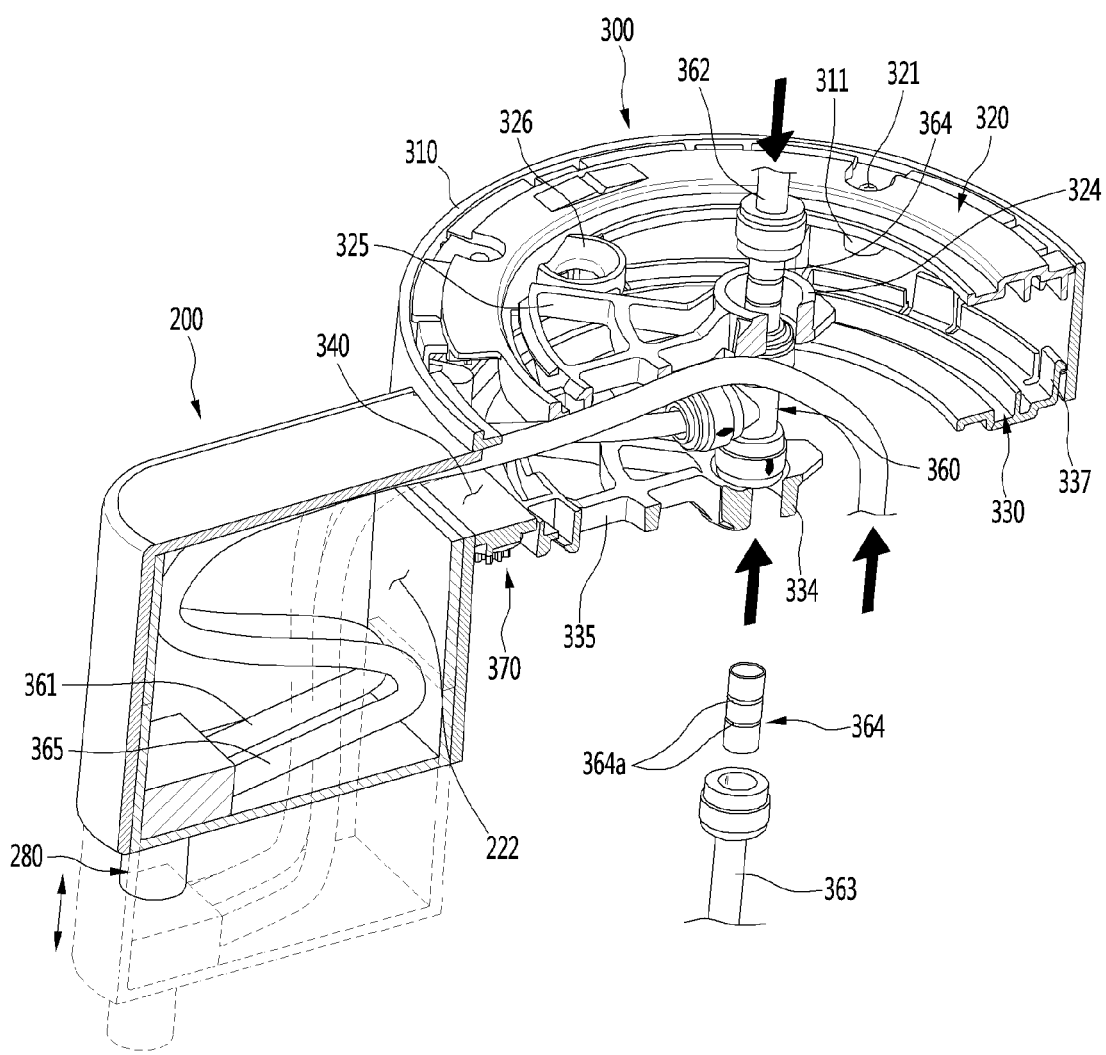
FIG. 10 is a view showing a channel structure in the rotator and a dispenser module.

FIG. 7 is a top perspective view of the rotator of the water purifier. FIG. 8 is a bottom perspective view of the rotator. FIG. 9 is an exploded perspective view of the rotator of the water purifier. FIG. 10 is a view showing a channel structure in the rotator and the dispenser module.

As shown in the figures, the rotator 300 has a rotator housing 310. The rotator housing 310 is formed in a cylindrical shape having an internal hole and a height that is small relative to the diameter.

The rotator 300 includes a top guide bracket 320 and a bottom guide bracket 330 that are vertically spaced from each other inside the rotator housing 310. Protrusive fastening portions 311 are formed on the inner side of the rotator housing 310 and fastening holes 321 and 331 are formed and circumferentially arranged with intervals at the top guide bracket 320 and the bottom guide bracket 330, respectively. The top and bottom guide brackets 320 and 330 can be fastened to the inner side of the rotator housing 310 with a gap therebetween by inserting bolts etc. in the fastening portions 311 through the fastening holes 321 and 331.

Several fastening hooks 327 and 337 may be circumferentially arranged on the top guide bracket 320 and the bottom guide bracket 330 and fastening protrusions 312 may be formed on the inner side of the rotator housing 310. The fastening hooks 327 and 337 and the fastening protrusions 312 can be locked to each other, thereby fixing the top guide bracket 320 and the bottom guide bracket 330 combined with each other.

The rotator 300 further has rail grooves 322 and 332 circumferentially formed on the top guide bracket 320 and the bottom guide bracket 330, respectively. The rail grooves 322 and 332 may be a top rail groove 322 retaining a first rotation guide rail 111d formed at the upper cover 111a and a bottom rail groove 332 retaining a second rotation guide rail 133b formed at the rotator seat 133.

Rotation guide protrusions 323 and 333 protrude upward or downward from a side of the top rail groove 322 or the bottom rail groove 322 or protrude upward and downward from sides of the top rail groove 322 and the bottom rail groove 332.

The rotator 300 includes a circular top center ring 324 and a circular bottom center ring 334 disposed at the centers of the top guide bracket 320 and the bottom guide bracket 330. Top bridges 325 and bottom bridges 335 horizontally extend from the inner sides of the top guide bracket 320 and the bottom guide bracket 330 to the top center ring 324 and the bottom center ring 334, so the top center ring 324 and the bottom center ring 334 are connected and supported to the top guide bracket 320 and the bottom guide bracket 330 by the top bridges 325 and the bottom bridges 335. The top and bottom bridges 325 and 335 are arranged in an arc shape and have a plurality of holes inside them.

The top center ring 324 and the bottom center ring 334 are provided to let a worker know the position of a water dispensing tube for discharging water. The top center ring 324 and the bottom center ring 334 are formed at the center of the rotator 300 and function as a rotational center when the rotator 300 is rotated.

A T-connector 360 may be disposed in the top center ring 324 and the bottom center ring 334. A water dispensing tube 361 extending to the dispenser module 200 and connected to the dispenser nozzle 280 is connected to a side (a horizontal opening) of the T-connector 360, and a cold water tube 362 and a purified water tube 363 are respectively connected to both ends (a vertical top end and a vertical bottom end) of the T-connector 360. The purified water tube 363 and the cold water tube 362 can be connected to the T-connector 360 by rotary pipes 364.

The cold water tube 362 and the purified water tube 363 pass through the top center ring 324 and the bottom center ring 334, respectively, and the T-connector 360 is disposed in the space between the top center ring 324 and the bottom center ring 334. Accordingly, the T-connector 360 can be maintained at the position.

The rotary pipes 364 may be made of stainless steel. Fitting grooves 364a may be formed on the upper portion and the lower portion of each of the rotary pipes 364. Metallic collets are inserted in the fitting grooves 364a when the upper ends and the lower ends of the rotary pipes 364 are coupled to the T-connector 360.

Accordingly, rotation of the T-connector 360 on the rotary pipes 364 when the rotator 300 is rotated can be prevented, and twist of pipes forming channels for providing water can be prevented. In particular, since the rotary pipes 364 are made of stainless steel, they are not damaged and deformed even by repetitive rotation by rotation of the rotator 300 and coupling of the metallic collets.

A joint hole 340 through which the water dispensing tube 361 passes may be formed at the joint between the rotator 300 and the dispenser module 200.

The water dispensing tube 361 coming out from between the top guide bracket 320 and the bottom guide bracket 330 of the rotator 300 and a hot water tube 365 to be described below can extend to the dispenser module 200 through the joint hole 340.

Further, the water dispensing tube 361 and the hot water tube 365 to be described below are held and fixed by the joint hole 340, the pipe are not entangled or twisted together even though the dispenser module 200 is rotated and moved up/down.

The hot water tube 365 connected to the induction heating assembly 160 to supply hot water can be directly connected to the dispenser nozzle 280. Accordingly, when hot water is dispensed, the water in the hot water tank can be immediately supplied, so the quality of the hot water is improved. That is, if the same channel is used for hot water and cold water or purified water, the temperature of the hot water that is dispensed first cannot satisfy the desired level due to cold water or purified water remaining in the channel when hot water is dispensed. However, when the separate hot water tube 365 is connected to the dispenser nozzle 280, the hot water in the hot water tank can be supplied to the dispenser nozzle 280 without a loss of temperature.

Further, the hot water tube 365 may be connected to the dispenser nozzle 280, unlike the cold water tube 362 and the purified water tube 363, through the outside of the top center ring 324 and the bottom center ring 334 or through a separate fixing guide (not shown) disposed outside the top center ring 324 and the bottom center ring 334, without passing through the top center ring 324 and the bottom center ring 334.

Accordingly, the tubes 362, 363, and 365 that form the channels for dispensing water are not entangled or twisted when the dispenser module 200 is turned.

On the other hand, circular coupling holes are formed inside coupling rings 326 and 336 and the coupling rings 326 and 336 each may be provided in pairs at left and right sides. The pairs of coupling rings 326 and 336 disposed at the left and right sides may be each symmetrically arranged on a center line radially crossing the rotational axis of the rotator 300. The coupling rings 326 and 336 may be formed at both of the top guide bracket 320 and the bottom guide bracket 330 or only at the top guide bracket 320.

The coupling rings 326 and 336 can be fitted to a pair of rotational coupling portions 421 protruding downward from the bottom of the operation unit 400. In detail, the pair of rotational coupling portions 421 can be inserted through the coupling rings 326 and 336, so when the rotator 300 is rotated, the operation unit 400 can be correspondingly rotated.

Since the operation unit 400 and the rotator 300 are combined, when the operation unit 400 and the rotator 300 are rotated together, the dispenser button 410 and the dispenser module 200 are also turned together. Therefore, the dispenser button 410 and the dispenser nozzle 280 are turned on the same line, so it is not required to additionally align the dispenser button 410 and the dispenser nozzle 25 with each other, and accordingly, a user can more conveniently operate the water purifier.

Furthermore, an oil damper 370 may be disposed on the bottom of the rotator 300, that is, on the bottom guide bracket 330. The oil damper 370 allows the rotator 300 to be smoothly rotated without being locked when the dispenser module 200 is rotated. Further, the oil damper 370 allows the rotator 300 to be rotated at a predetermined speed as long as a predetermined magnitude of force is applied.

The oil damper 370 is a common part that is used to maintain a predetermined rotational speed, so it is not described in detail. The pinion gear 371 is fitted on a rotary shaft of the oil damper 370. The pinion gear 371 is in mesh with the internal gear 133a on the top of the filter bracket 130, so it can be moved along the internal gear 133a.

The pinion gear 371 is formed in a circular shape with a radius of curvature that is very smaller than the radius of curvature of the internal gear 133a and has a smaller number of teeth. When the rotator 300 is disposed on the top of the filter bracket 130, the pinion gear 371 is engaged with the internal gear 133a, inside the internal gear 133a.

Figure 11:
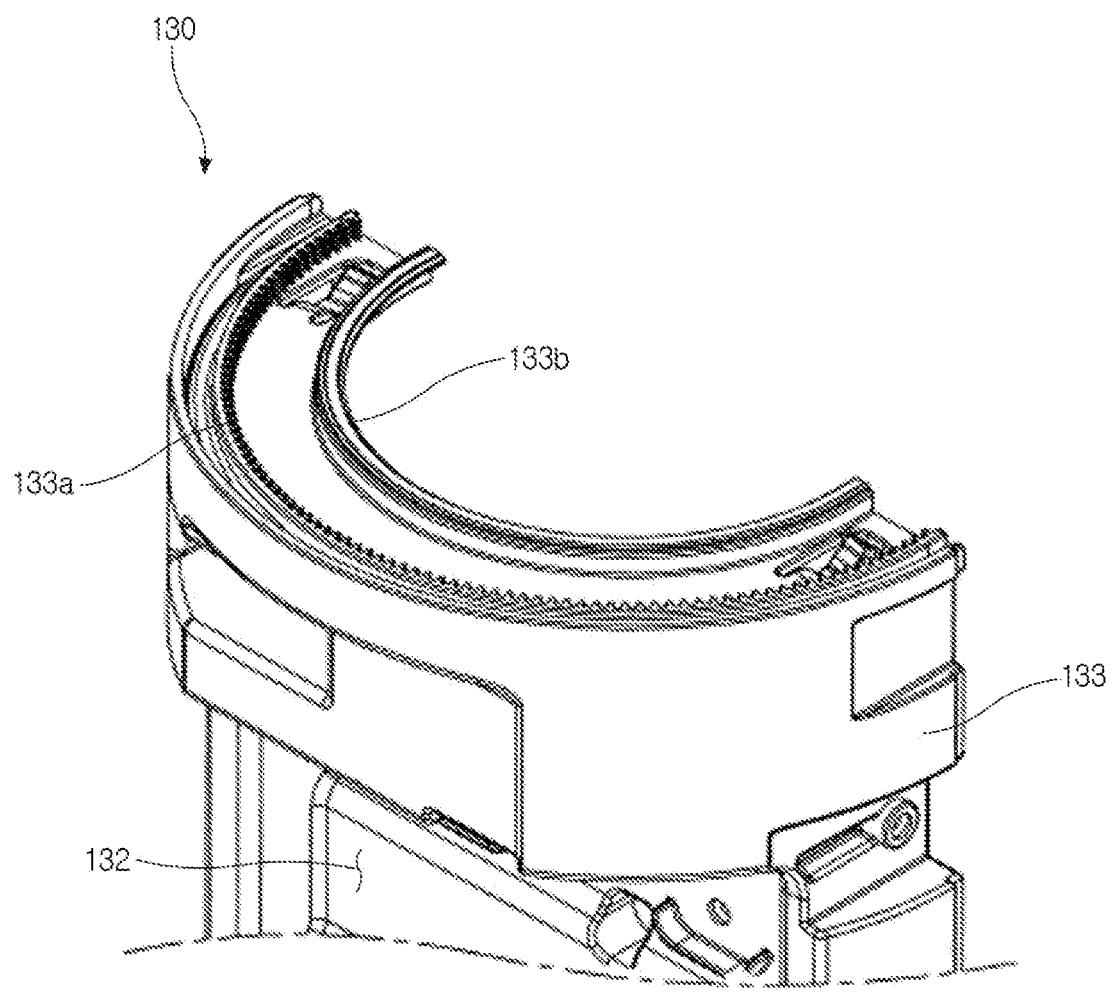
FIG. 11 is a partial perspective view of a filter bracket of the water purifier.
Figure 12:
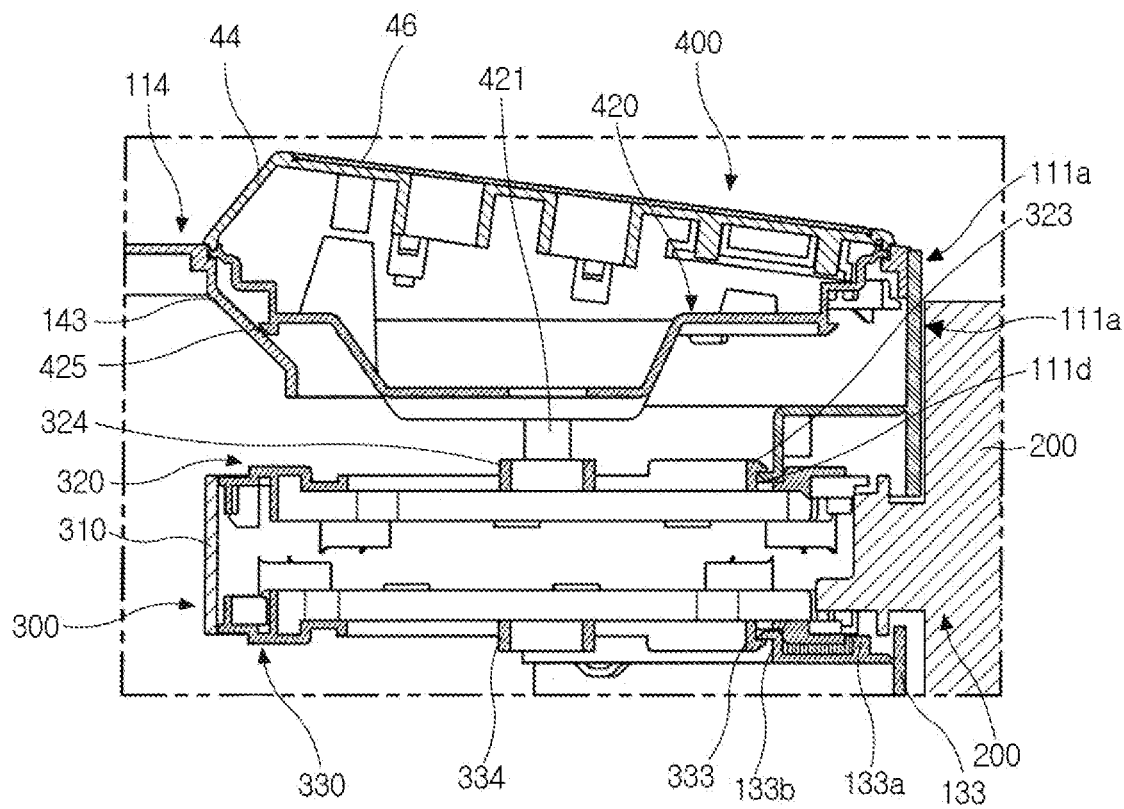
FIG. 12 is a cross-sectional view showing a coupling structure of the rotator.

FIG. 11 is a partial perspective view of the filter bracket of the water purifier. FIG. 12 is a cross-sectional view showing a coupling structure of the rotator.

As shown in the figures, the internal gear 133a is formed on the top of the filter bracket 130. The internal gear 133a may be formed with predetermined curvature on the top of the rotator seat 133. The internal gear 133a is radially spaced from the second rotation guide rail 133b. The internal gear 133a may be positioned close to the outer edge of the top of the filter bracket 130, coaxially with the second rotation guide rail 133b. Accordingly, the internal gear 133a can be engaged with the pinion gear 371 when the rotator 300 is disposed.

The rear side of the filter bracket 130 is open rearward and the rear end of the filter bracket 130 is coupled to the front ends of the side panels 115. The second rotation guide rail 133b is formed on the top of the filter bracket 130 so that the rotator 300 is disposed to be rotatable to the left and right.

The second rotation guide 133b may be formed in a semicircular shape to guide the rotator 300 when the rotator 300 is rotated. The second rotation guide rail 133b may be fixed inside the top of the filter bracket 130.

The first rotation guide rail 111d protruding from the inner side of the upper cover 111a may be further provided. The first rotation guide rail 111d is disposed over the second rotation guide rail 133b and has the same shape as the second rotation guide rail 133b, thereby guiding the rotator 300 when the rotator 300 is rotated.

The first rotation guide rail 111d and the second rotation guide rail 133b are vertically spaced from each other with the rotator 300 therebetween. Accordingly, the upper and lower ends of the rotator 300 are fitted in the first rotation guide rail 111d and the second rotation guide rail 133b when the rotator 300 is disposed, whereby the rotator 300 is guided when it is rotated.

The rotator 300 is a component for horizontally turning the dispenser module 200 to the left or right. The rotator 300 does not have rotary shaft at the center, but has the rotation guide protrusions 322 and 333 formed around the center with predetermined curvature, so it can slide along the rotation guide rails 111d and 133b using the rotation guide protrusions 322 and 333.

The rotation guide protrusions 323 and 333 are formed at the rotator 300 and the rotation guide rails 111d and 133b are formed at the upper cover 111 and the filter bracket 130, respectively, but the rotation guide protrusions 323 and 333 and the rotation guide rails 111d and 133b may be formed with the same curvature and engaged with each other, whereby the rotation 300 can be guided when it is rotated.

In detail, for example, the rotation guide protrusions 322 and 333 may be the bottom rotation guide protrusion 333 protruding downward from the bottom rail groove 332 of the bottom guide bracket 330 and the top rotation guide protrusion 323 protruding upward from the top rail groove 322 of the top guide bracket 320.

The ends of the rotation guide protrusions 323 and 333 may be formed in a hook shape. When the rotation guide protrusions 323 and 333 and the rotation guide rails 111d and 133b are fitted to each other, the inner sides of the ends of the rotation guide protrusions 323 and 333 may face portions of the rotation guide rails 111d and 133b to overlap each other in the thickness direction in contact with each other.

The rotation guide protrusions 323 and 333 are formed to have the same curvature as the rotation guide rails 111d and 133b and fitted in the rotation guide rail 111d and 133b to be able the slide in rotational directions. When the rotation guide protrusions 323 and 333 and the rotation guide rails 111d and 133b are fitted to each other, the rotation guide rails 111d and 133b are inserted in the rail grooves 322 and 332 formed inside the rotation guide protrusions 323 and 333, so surfaces of the rotation guide rails 111d and 133b and the rail grooves 322 and 332 overlap each other in the thickness direction. Further, since the ends of the rotation guide protrusions 323 and 333 are formed in a hook shape, the rotation guide protrusions 323 and 333 overlap the rotation guide rails 111d and 133b.

According to this structure, it is possible to stably turn the dispenser module 200 and it is also possible to freely change the position of the dispenser nozzle 280 even without separating the dispenser module 200. In this case, there is no need for a specific rotary shaft at the center of the rotator 300.

For example, according to the structure in which the dispenser module 200 protrudes forward from a side of the rotator 300, it is possible to solve the problem that the dispenser module 200 is lifted up or pressed down and rotation of the dispenser module 200 and the rotator 300 becomes unstable due to eccentric load of the dispenser module 200 even though a user holds the dispenser module 200 and rotates the rotator 300. Further, separation of the rotator 300 can be prevented by the hook shapes of the rotation guide protrusions 323 and 333.

Further, since the contact areas of the rotation guide protrusions 323 and 333 and the rotation guide rails 111d and 133b are large when the rotator 300 is rotated, the eccentric load can be distributed and damage such as wear and scratch due to friction can be reduced when a user holds and turns the dispenser module 200.

It is preferable for the rotation guide protrusions 323 and 333 formed at the top guide bracket 320 and the bottom guide bracket 330, respectively, to be made of a material different from that of the rotation guide rails 111d and 133b. More preferably, the rotation guide protrusions 323 and 333 may be made of engineering plastic (POM) having excellent fatigue resistance, rigidity, and abrasion resistance. Accordingly, it is possible to reduce wear and noise due to friction between the rotation guide protrusions 323 and 333 and the rotation guide rails 111d and 133b when the rotation guide protrusions 323 and 333 are rotated along the guide rails 111d and 133b.

Hereafter, the lifter is described.

Figure 13:
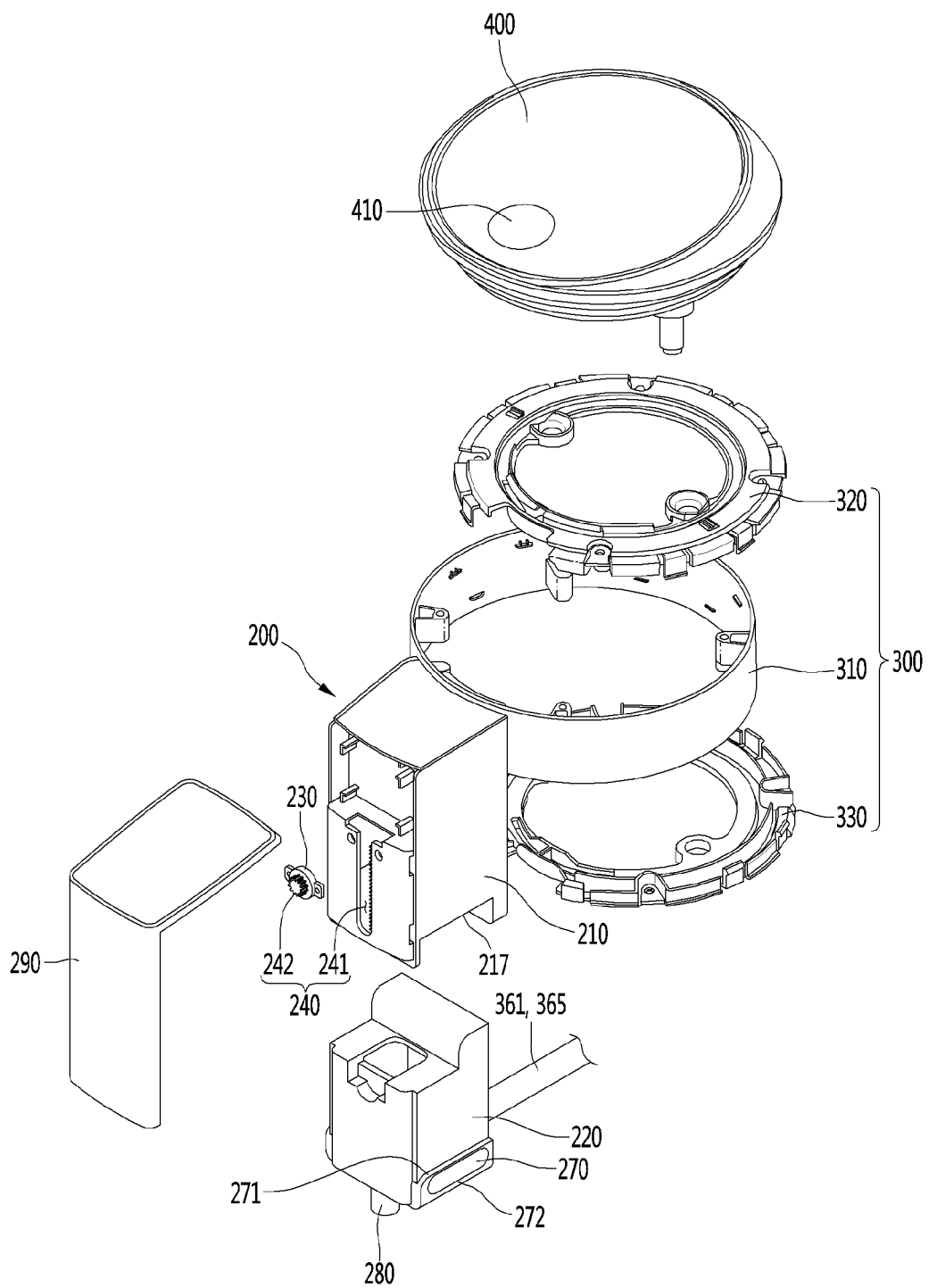
FIG. 13 is an exploded perspective view of a dispenser module that is a component of the present invention.

FIG. 13 is an exploded perspective view of the dispenser module that is a component of the present invention.

Referring to FIG. 13, the lifter includes: a fixed case 210 fixed outside the rotator 300, having a vertical lifting space 211 therein, being open at the bottom so that the lifting space 211 communicates with the external space, and fixed to the water purifier body 100; a moving case 210 having the dispenser nozzle 80 fixed thereto and disposed to move up/down in the lifting space 211 of the fixed case 210; and a resisting member 230 disposed on the fixed case 210 or the moving case 220 and reducing a force that is applied to the moving case 220 to move up/down the moving case 220.

The fixed case 210 is detachably fixed to the water purifier body 100 to support the moving case 220 such that the moving case 220 can be moved up/down on the water purifier body 100. Accordingly, the moving case 220 can be moved up/down on the water purifier body 100 by the fixed case 210.

The fixed case 210 has the lifting space 211 where the moving case 220 is received, and the bottom of the lifting space 211 is open to communicate with the outside. Accordingly, the moving case 220 disposed in the lifting space 211 can protrude downward out of the fixed case 210.

In this embodiment, the fixed case 210 may be open at the rear side (the right side in figures) connected to the water purifier body 100. For example, the fixed case 210 may have a front and sides extending rearward from the front at both sides.

The dispenser nozzle 280 is fixed to the bottom of the moving case 220 and the moving case 220 is disposed in the lifting space 211 of the fixed case 210, whereby the moving case 220 is moved up/down on the fixed case 210.

The external shape may correspond to the shape of the lifting space 211 of the fixed case 210. For example, the fixed case 210 and the moving case 220 may have a rectangular cross-section. Alternatively, the fixed case 210 and the moving case 220 may have a circular cross-section. Further, the fixed case 210 and the moving case 220 may various cross-sections.

In this embodiment, the moving case 220 may be open at the rear side (the right side in figures) facing the water purifier body 100. As described, when the moving case 220 is open at the right side, the internal space of the moving case 220 can communicate with the internal space of the water purifier body 100, so supply hoses 361 and 365 for supplying at least one of purified water, cold water, and hot water produced in the water purifier body 100 can be connected to the dispenser nozzle 280 fixed to the moving case 220.

For example, the supply hoses 361 and 365 may be the water dispensing tube 361 connected with the purified water tube 363 and the cold water tube 362, and the hot water tube 365.

The water dispensing tube 361 and the hot water tube 365 may be made of a flexible material such as rubber and silicon to cope with up-down movement of the moving case 220 by bending or stretching.

In detail, when the moving case 220 is moved up, the dispenser nozzle 280 is moved up, and the gap between the dispenser nozzle 280 and the joint hole 340 is decreased, the water dispensing tube 361 and the hot water tube 365 are bent and received in the internal space 222 of the moving case 220.

On the contrary, when the moving case 220 is moved down, the dispenser nozzle 280 is moved down, and the gap between the dispenser nozzle 280 and the joint hole 340 is increased, the water dispensing tube 361 and the hot water tube 365 are stretched, whereby they can cope with the downward movement of the moving case 220.

According to this configuration, when the moving case 220 and the dispenser nozzle 280 are moved up/down, the water dispensing tube 361 and the hot water rube 365 can cope with the up-down movement of the moving case 220 by bending or stretching in the internal space 222 of the moving case 220. Further, cold water, purified water, and hot water can be supplied to the dispenser nozzle 280 regardless of the heights of the moving case 220 and the dispenser nozzle 280.

The moving case 220 may have a front and sides extending rearward from the front at both sides.

Further, by forming protrusions or grooves in the lifting direction of the moving case 220 at positions corresponding to each other on the fixed case 210 and the moving case 220, it is possible to more strongly keep the cases fastened to each other and guide the moving case 220 when it is moved straight.

If grooves are formed at the fixed case 210, protrusions fitted in the grooves can be formed at the moving case 220.

In contrast, if protrusions are formed at the fixed case 210, grooves fitted on the protrusions can be formed at the moving case 220.

The resisting member 230 is formed on the fixed case 210 or the moving case 220 and can reduce a force that is applied to the moving case 220 to move up/down the moving case 220.

The 'force' that is applied to the moving case 220 means all of forces that influence the up-down movement of the moving case 220.

For example, the force may be a force that is applied to the moving case 220 to pull down the moving case 220 by a user or a force that is applied to the moving case 220 to push up the moving case 220 by a user. Further, the force may be a force that is applied to the moving case 220 to move down the moving case 220 by gravity.

As described above, when the moving case 220 is moved up with respect to the fixed case 210, the moving case 220 may be freely moved down by its own weight. That is, the moving case 220 may be moved down out of the fixed case 210 by its own weight after the moving case 220 is fully pushed in the fixed case 210. Further, when a user holds and moves down the moving case 220 and then takes his/her hand off the moving case 220, the moving case 220 may be further moved down by its own weight without being fixed at the position. That is, it is difficult to maintain the moving case 220 at a desired height.

According to the present invention, the resisting member 230 is provided at the fixed case 210 or the moving case 220 to prevent this situation.

The resisting member 230 reduces the force that is applied to the moving case to move up/down the moving case 220.

Accordingly, when the moving case 220 is fully pushed in the fixed case 210, the moving case 220 can be maintained at the position without being freely moved down by its own weight. Further, even if a user takes his/her hand off the moving case 220 after holding and moving down the moving case 220 to a desired position, the moving case 220 can be fixed at the position. Therefore, the user can stop the dispenser nozzle 280 at a desired position and then catch water.

The resisting member 230 should be selected to prevent the moving case 220 from moving down due to its own weight and to prevent a user from applying excessive force to move up/down the moving case 220. Further, the resisting member 230 should be selected to enable a user to feel more easily up-down movement of the moving case 220.

For example, the resisting member 230 may a material having friction such as rubber or a material having viscosity such as oil. Further, the resisting member 230 may be modified in various ways as long as it can reduce the force that is applied to the moving case 220.

An example of the resisting member 230 will be described in detail below.

The dispenser module 200 may further include a front case 290 covering the front of the fixed case 210.

When the front of the dispenser module 200 is covered by the front cover 290, components such as the resisting member 230 and a guide mechanism 240 are not exposed to the outside, so the external appearance of the dispenser module 200 can be made aesthetic.

Further, the front case 290 is separably combined with the fixed case 210, so it is possible to separate the front case 290 from the fixed case 210 and check the resisting member 230 and the guide mechanism 240, if necessary. For example, the front case 290 and the fixed case 210 may be separably combined by hooks.

The front case 290 may have a top cover 291 coupled to the top of the fixed case 210.

The dispenser nozzle 280 may be made of stainless steel.

When the dispenser nozzle 280 is made of stainless steel, as described above, the dispenser nozzle 280 is sanitary because it does not rust, and damage and deformation due to frequent use can be prevented. Further, it is possible to make the external appearance aesthetic and add an elegant image to the water purifier 10.

The dispenser nozzle 280 may be integrated with the moving case 220 or a connector 281 connecting the moving case 220 and the dispenser nozzle 280 to each other, through insert injection.

The connector 281 is a part connecting the dispenser nozzle 280 to the supply hoses 361 and 365 and can be separably combined with the moving case 220.

As described above, when the dispenser nozzle 280 is integrated with the moving case 220 or the connector 281 through insert injection, the dispenser nozzle 280 can be more strongly fixed to the moving case 220 or the connector 281, or to the supply hoses 361 and 365, so leakage of water can be prevented. Further, manufacturing may become easy, as compared with existing assembly methods.

Figure 14:
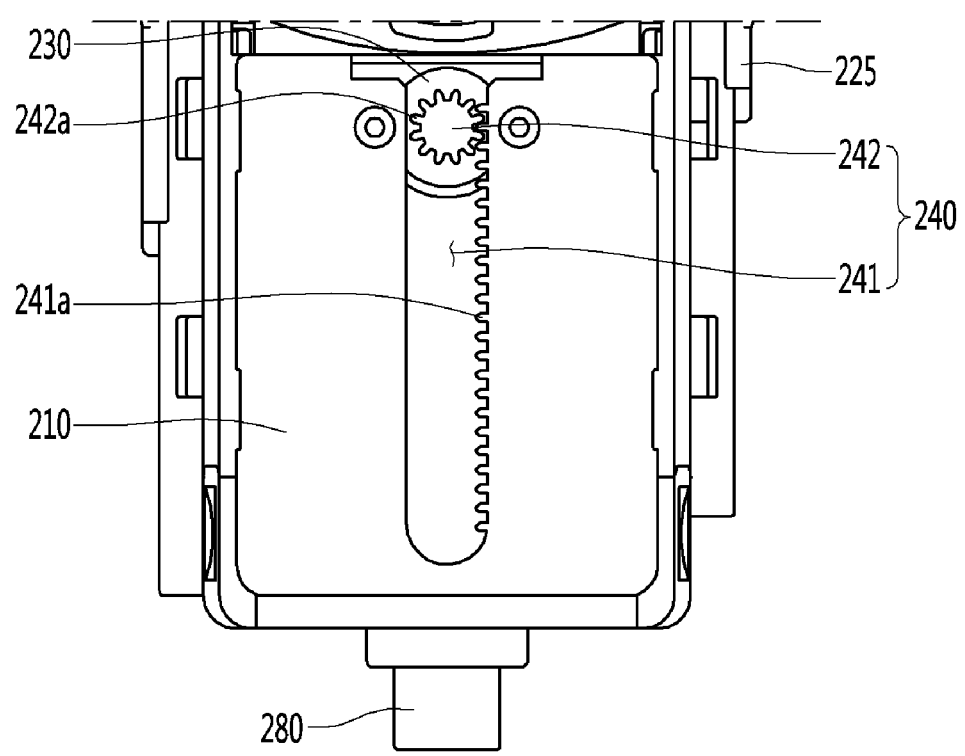
FIG. 14 is a front view when a moving case of the dispenser module has been moved up.
Figure 15:
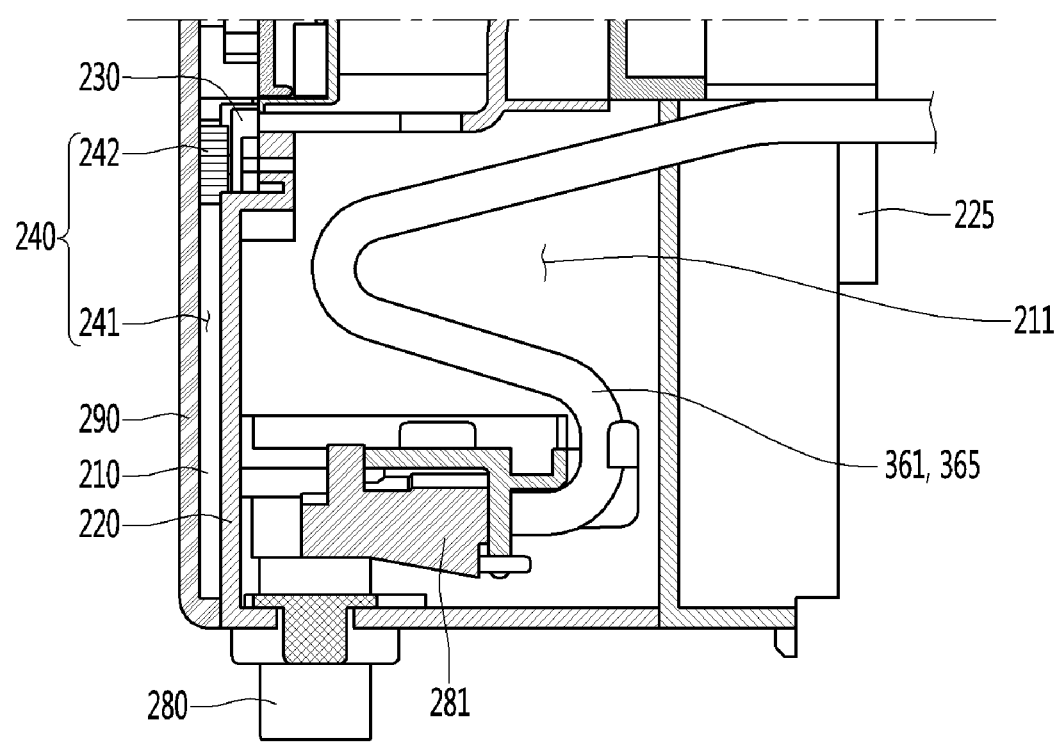
FIG. 15 is a vertical cross-sectional view when the moving case of the dispenser module has been moved up.
Figure 16:
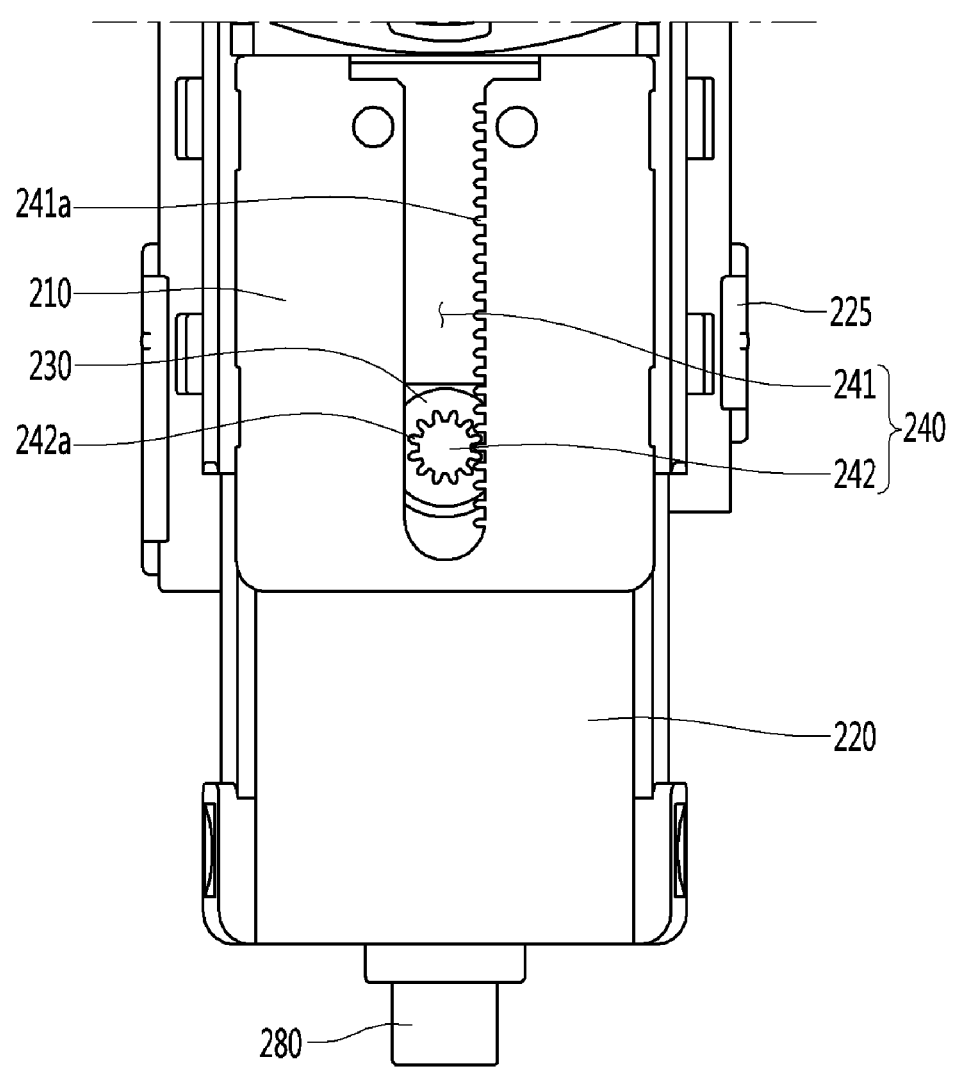
FIG. 16 is a front view when the moving case of the dispenser module has been moved down.
Figure 17:
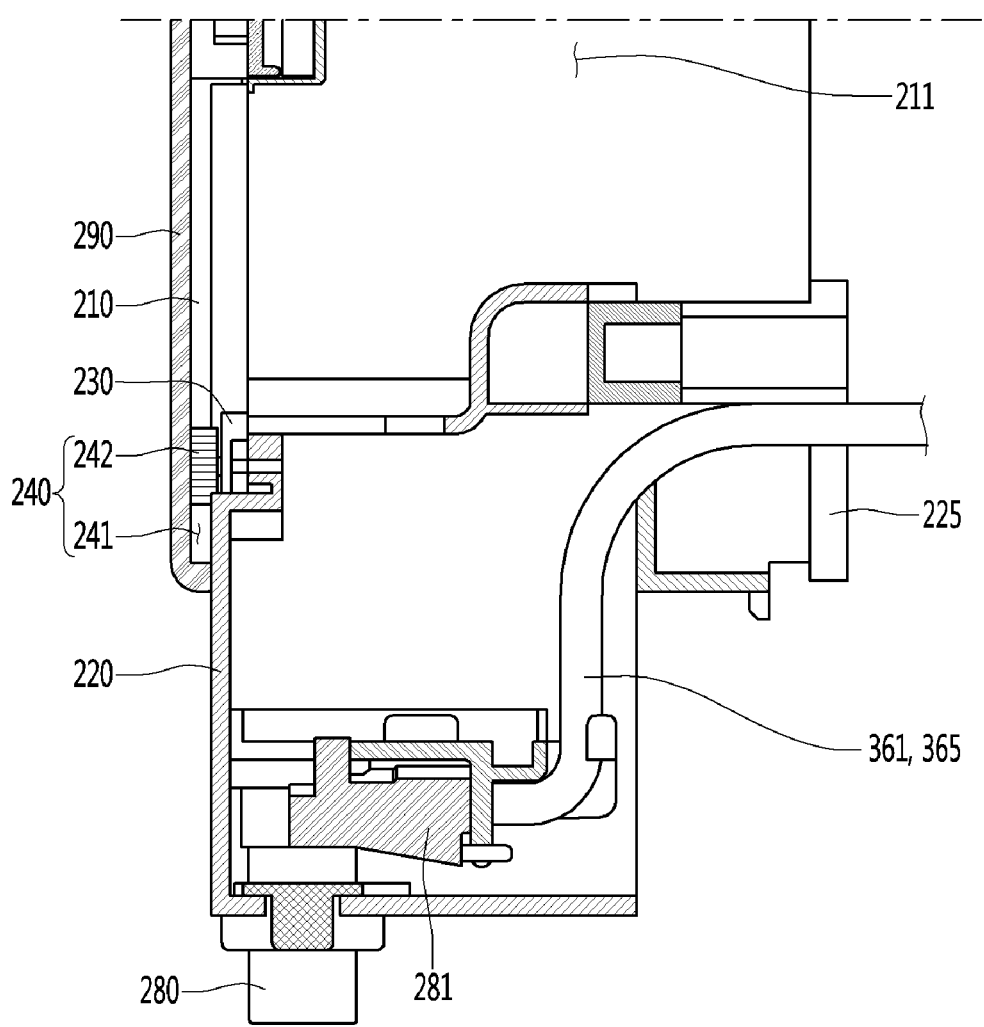
FIG. 17 is a vertical cross-sectional view when the moving case of the dispenser module has been moved down.

FIG. 14 is a front view when a moving case of the dispenser module has been moved up and FIG. 15 is a vertical cross-sectional view when the moving case of the dispenser module has been moved up. FIG. 16 is a front view when a moving case of the dispenser module has been moved down and FIG. 17 is a vertical cross-sectional view when the moving case of the dispenser module has been moved down.

Referring to FIGS. 14 to 17, the guide mechanism 240 guiding the moving case 220 such that the moving case 220 moves straight up/down may be disposed at the fixed case 210 or the moving case 220.

Since the moving case 220 is moved up/down in the fixed case 210, the moving case 220 can be guided to move straight up/down by the fixed case 210. However, if the moving case 220 comes out of the fixed case 210 and shakes even slightly to sides, the moving case 220 is unstably moved up/down, and if this situation is repeated, the fixed case 210 or the moving case 220 may be deformed and damaged.

According to the present invention, the guide mechanism 240 is separately provided.

The guide mechanism 240 may be achieved in various ways as long as it can guide the moving case 220 moving straight up/down in the fixed case 210.

For example, the guide mechanism 240 may include a straight rail vertically formed at the fixed case 210 and a roller disposed on the moving case 220 to run on the straight rail.

Alternatively, the guide mechanism 240 may include a straight rail vertically formed at the moving case 220 and a roller disposed on the fixed case 210 to run on the straight rail.

Further, the guide mechanism 240 may include a guide groove 241 vertically formed at the fixed case 210 and a guide 242 disposed on the moving case 220 and fitted in the guide groove 241.

Alternatively, the guide mechanism 240 may include a guide groove vertically formed at the moving case 220 and a guide disposed on the fixed case 220 and fitted in the guide groove.

The guide 242 is fitted and moved straight along the straight guide groove 241. Accordingly, the moving case 220 can be moved straight up/down.

The guide 242 may be rotatably disposed on the moving case 220.

When the guide 242 is rotatably disposed on the moving case 220, as described above, the guide 242 can be moved straight up/down in the guide groove 241 with minimum friction on the guide groove 241. Accordingly, the moving case 220 can be more smoothly moved up/down and a user can also more easily operate the moving case 220.

Further, first gear teeth 241a may be formed inside the guide groove 241 and second gear teeth 242a engaged with the first gear teeth 241a may be formed on the outer side of the guide 242.

That is, the guide groove 241 and the guide 242 can be engaged with each other like a rack and pinion and the guide 242 can move straight up/down in the guide groove 242 while rotating.

For example, when a user pulls down the moving case 220, the guide 242 rotates counterclockwise in the figures and moves down in the guide groove 241 with the gear teeth 241a and 242a in mesh with each other.

On the other hand, when a user pushes up the moving case 220, the guide 242 rotates clockwise in the figures and moves up in the guide groove 241 with the gear teeth 241a and 242a in mesh with each other.

When the gear teeth 241a and 242a are formed, the gear teeth 241a and 242a are in mesh with each other, so the guide 242 can more accurately move up/down in the guide groove 241 while rotating. Accordingly, the moving case 220 can more accurately move straight up/down. Further, the guide 242 does not idle in the guide groove 241, so a user can move up/down the moving case 220 to desired heights.

The first gear teeth 241a or the second gear teeth 242a each may have a straight section, which is perpendicular to the lifting direction of the moving case 220 or is inclined, or a curved section. In particular, the first gear teeth 241a or the second gear teeth 242a may be curved partially or entirely.

When the first gear teeth 241a or the second gear teeth 242a are curved, as described above, the first gear teeth 241a and the second gear teeth 242a can be smoothly engaged with each other and a user can smoothly operate the moving case 220. Further, it is possible to prevent the first gear teeth 241a or the second gear teeth 242a from being damaged by force that is applied to the first gear teeth 241a or the second gear teeth 242a when a user holds and moves up/down the moving case 220.

If the first gear teeth 241a or the second gear teeth 242a are formed straight and have a pointed end, force is concentrated on the ends, so the gear teeth may be broken.

For example, the ridges and grooves formed by the first gear teeth 241a or the second gear teeth 242a may protrude or may be recessed in a semicircular shape.

Further, the first gear teeth 241a and the second gear teeth 242a may be formed in various shapes as long as the second gear teeth 242a can certainly transmit power by rotating in mesh with the first gear teeth 241a and the guide 242 can move straight in the guide groove 241a.

The resisting member 230 may be an oil damper.

An oil damper means a part that including oil in a housing and absorbs energy using the viscous resistance of the oil.

The oil damper, for example, may include a cylindrical housing, oil having predetermined viscosity and filled in the housing, rotary blades disposed in the housing, having a plurality of holes for passing the oil, and formed in the radial direction of the housing, and a rotary shaft coupled to the rotary blades.

Accordingly, when torque is applied to the rotary shaft, the torque can be reduced by the viscous resistance of the oil.

Figure 18:
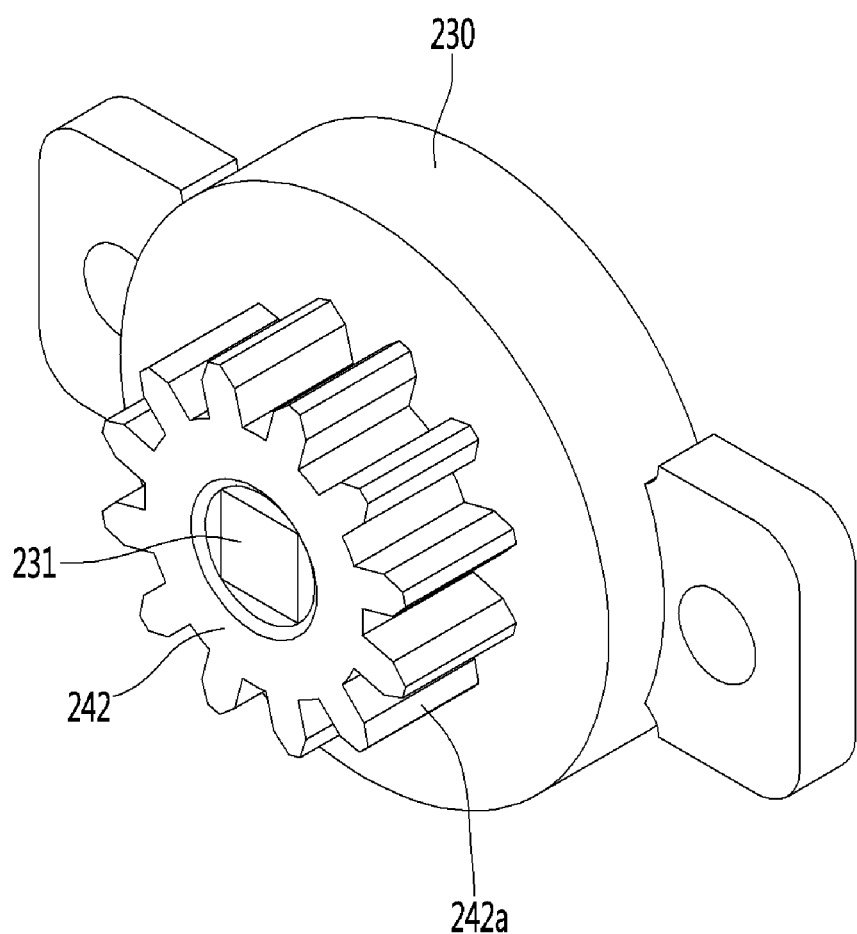
FIG. 18 is a perspective view showing an assembly of a resisting member and a guide that are components of the present invention.

FIG. 18 is a perspective view showing an assembly of the resisting member and the guide that are components of the present invention.

As shown in the figure, the resisting member 230 is an oil damper and the guide 242 can be fitted on a rotational shaft 231 of the resisting member 230.

When a force is applied to the moving case 220 to move up/down the moving case 220, the guide 242 rotatably combined with the moving case 220 is rotated.

Torque of the guide 242 is reduced by the resisting member 230, that is, an oil damper.

Accordingly, when the moving case 220 is fully pushed in the fixed case 210, the moving case 220 can be maintained at the position by the viscous resistance of the resisting member 230 without being freely moved down. Further, even if a user takes his/her hand off the moving case 220 after holding and moving down the moving case 220 to a desired position, the moving case 220 can be fixed at the desired position by the viscous resistance of the resisting member 230.

The viscosity of the oil of the oil damper can be adjusted to various levels as long as the resisting member 230 prevents the movable case 220 from moving down due to its own weight and a user does not need to apply excessive force to move up/down the moving case 220. Further, the viscosity of the oil of the oil damper can be adjusted to various levels as long as a user can feel more easily up-down movement of the moving case 220.

Figure 19:
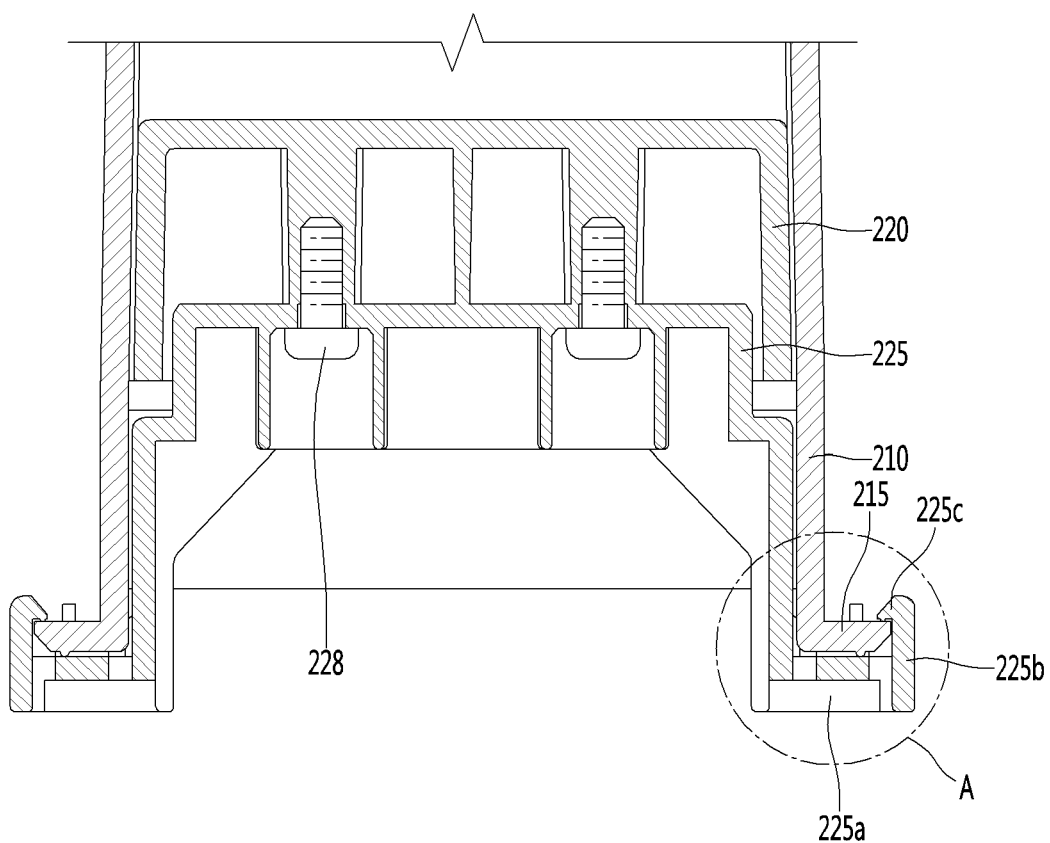
FIG. 19 is a horizontal cross-sectional view of the dispenser module that is a component of the present invention.
Figure 20:
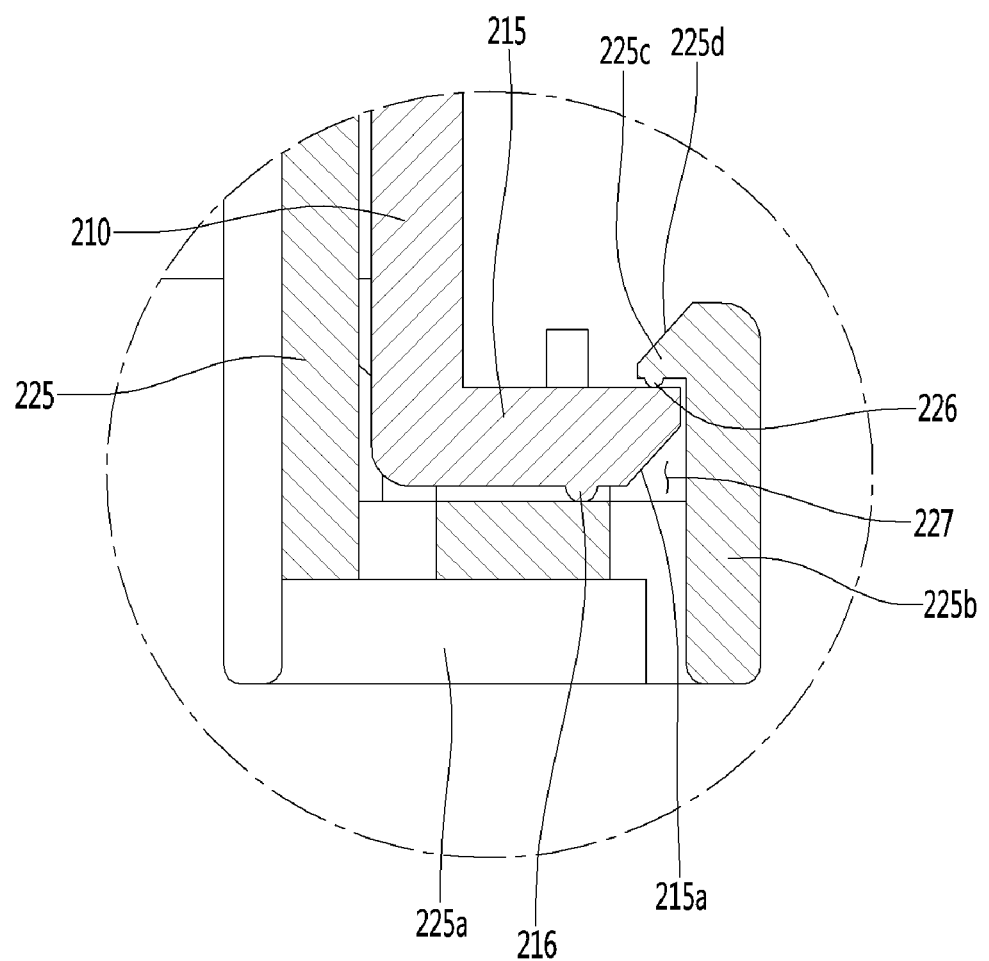
FIG. 20 is an enlarged view of the area A of FIG. 19.

FIG. 19 is a horizontal cross-sectional view of the dispenser module that is a component of the present invention. FIG. 20 is an enlarged view of the area A of FIG. 19.

Referring to FIGS. 19 and 20, the fixed case 210 and the moving case 220 may be in line contact with each other.

The 'line contact' means, as in the cross-sectional views of FIGS. 19 and 20, that the fixed case 210 and the moving case 220 are in point contact and the point contact continues in the lifting direction of the moving case 220, whereby the fixed case 210 and the moving case 220 are in line contact in the lifting direction of the moving case 220.

To this end, one or more contact protrusions 216 and 226 are formed at the fixed case 210 or the moving case 220 in the lifting direction of the moving case 220.

For example, when the contact protrusions 216 are formed at the fixed case 210, the contact protrusions 216 are in line contact with the moving case 220. Alternatively, when the contact protrusions 226 are formed at the moving case 220, the contact protrusions 226 are in line contact with the fixed case 210.

Alternatively, when the contact protrusions 216 are formed at the fixed case 210, contact grooves may be formed at the moving case 220 at positions corresponding to the contact protrusions 216. Further, when the contact protrusions 226 are formed at the moving case 220, contact grooves may be formed at the fixing case 210 at positions corresponding to the contact protrusions 226.

As described above, when the fixed case 210 and the moving case 220 are in line contact with each other by the contact protrusions 216 and 226, the fixed case 210 and the moving case 220 can support each other in contact with each other with minimum friction therebetween, so the moving case 220 can be stably moved up/down. Further, since the cases support each other in contact with each other, deformation such as bending of the fixed case 210 and the moving case 220 can be maximally prevented.

For example, the contact protrusions 216 and 226 may have a semicircular convex horizontal cross-section. When the contact protrusions 216 and 226 are formed in a curved shape, the moving case 220 can be more smoothly moved up/down with the fixed case 210 and the moving case 220 in line contact with each other.

The fixed case 210 has flanges 215 extending outward from both sides of the rear portion thereof and the moving case 220 has extensions 225a formed in parallel with the flanges 215 on both sides of the rear portion thereof and bending portions 225b bending and extending forward from the extensions 255a and having hooks 225c bending at the ends thereof. The flanges 215 can be inserted in grooves 227 between the extensions 225a and the hooks 225c.

The end of the fixed case 210 is reinforced by the flanges 215, so deformation such as bending can be prevented.

The grooves 227 are formed at the moving case 220 to receive the flanges 215, so the moving case 220 can be more strongly fastened to the fixed case 210. Accordingly, it is possible to separation of the fixed case 210 and deformation between the moving case 220 and the fixed case 210.

As the flanges 215 are formed at the fixed case 210 and the hooks 225c are formed at the moving case 220, the moving case 220 and the fixed case 210 can be separably combined with each other in a hook type.

In this embodiment, the moving case 220 may include a guide member 225.

The guide member 225 can be fastened to the moving case 220 by fasteners 228 such as bolts.

The extensions 225a, bending portions 225b, and hooks 225c may be formed at both sides of the guide member 225.

Accordingly, the guide member 225 can be moved up/down in the fixed case 210, so the moving case 220 coupled to the guide member 225 can also be moved up/down in the fixed case 210.

The first contact protrusions 216 may be formed on the surfaces, which face the extensions 225a, of the flanges 215 in the lifting direction of the moving case 220. The first contact protrusions 216 are in line contact with the extensions 225a.

The second contact protrusions 226 may be formed on the surfaces, which face the flanges 215, of the hooks 225c in the lifting direction of the moving case 220. The second contact protrusions 226 are in line contact with the flanges 215.

When the first contact protrusions 216 and the second protrusions 226 are formed, as described above, the moving case 220 can be moved up/down with the fixed case 210 and the moving case 220 in double line contact with each other, so the moving case 220 can be stably moved up/down without shaking forward/rearward.

Further, since the flanges 215 are inserted in the grooves 227, the bending portions 225b are supported by the flanges 215, so the moving case 220 can be stably moved up/down without shaking left/right.

Slopes 215a and 225b may be formed in parallel with each other on the rear sides of the flanges 215 and the front sides of the hooks 225c.

When the slopes 215a and 225d are formed at the flanges 215 and the hooks 225c, the moving case 220 can be easily fitted into the fixed case 210 from behind the fixed case 210.

For example, the fixed case 210 and the movable case 220 may be open at the rear sides.

The moving case 220 can be inserted into the fixed case 210 from behind the fixed case 210, but when the blades 215 and the hooks 225c are formed, the moving case 220 may not be smoothly inserted due to interference of the blades and hooks.

The slopes 215a and 225d are formed in parallel with each other on the rear sides of the flanges 215 and the front sides of the hooks 225c in order to prevent this situation, so the moving case 220 can be easily inserted into the fixed case 210 from behind the fixed case 210.

Handles 272 protruding outward may be formed at the lower ends of both sides of the moving case 220 and handle seats 217 for seating the handles 272 may be formed at the lower ends of both sides of the fixed case 210.

Steps 271 may be formed over the handles 272. Accordingly, when a user holds the handles 272 and move up the moving case 220, the steps 271 over the handles 272 are locked to the handle seats 217. Therefore, the handle seats 217 can function as stoppers that limit the lifting height of the moving case 220.

Holding grooves 270 may be formed inside the handles 272.

Since the holding grooves 270 are formed, a user can hold the holding grooves 270 and move up/down the moving case 220. The user can move up/down the moving case 220 without slip.

Alternatively, prominences and recessions or holding protrusions protruding outward may be formed at the handles 272 to prevent slip when the moving case 220 is moved up/down.

At least one of the fixed case 210 and the moving case 220 may be made of engineering plastic having excellent fatigue resistance, rigidity, and abrasion resistance, and a lubricant property.

For example, at least one of the fixed case 210 and the moving case 220 may be made of polyoxymethylene (POM).

Accordingly, it is possible to reduce wear and noise due to friction between the fixed case 210 and the moving case 220 when the moving case 220 is moved up/down in the fixed case 210.

Further, the moving case 220 is smoothly moved up/down when a user pulls down the moving case 220 or pushes up the moving case 220 that has been moved down, the user can more easily moves up/down the moving case 220.

The tray that is a component of the present invention is described hereafter.

Figure 21:
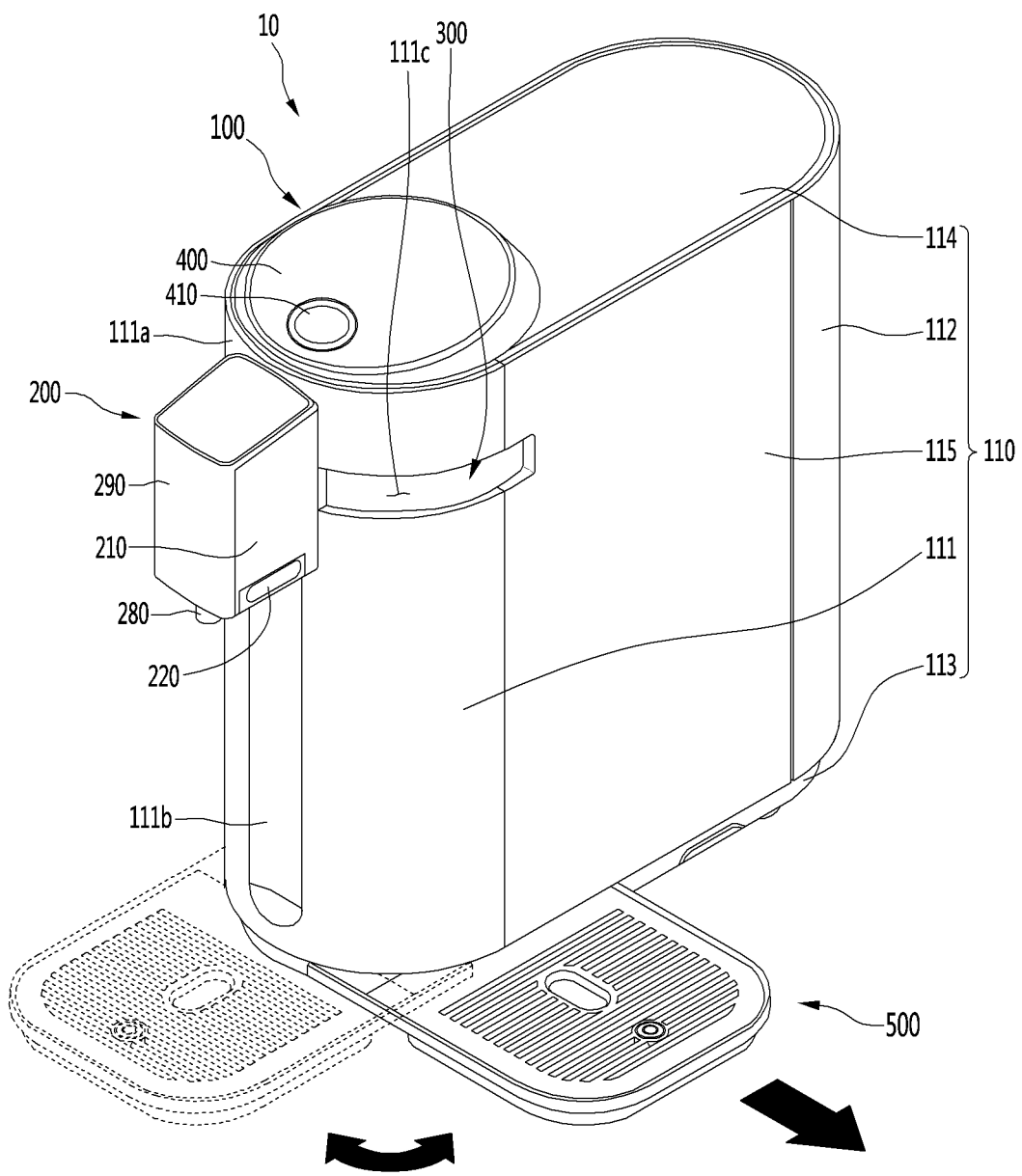
FIG. 21 is a perspective view showing rotation of a tray of the water purifier.
Figure 22:
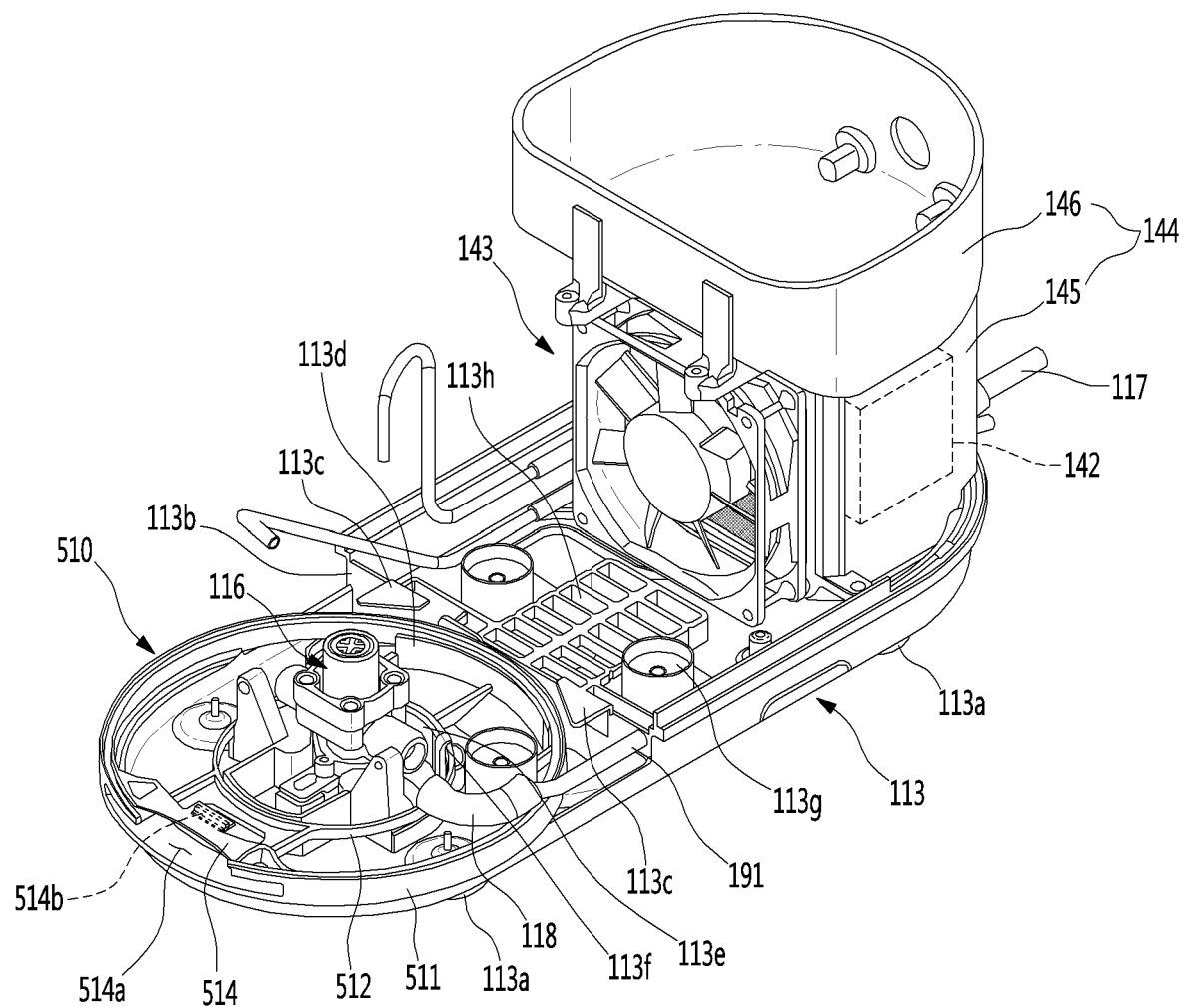
FIG. 22 is a perspective view showing a base of the water purifier.
Figure 23:
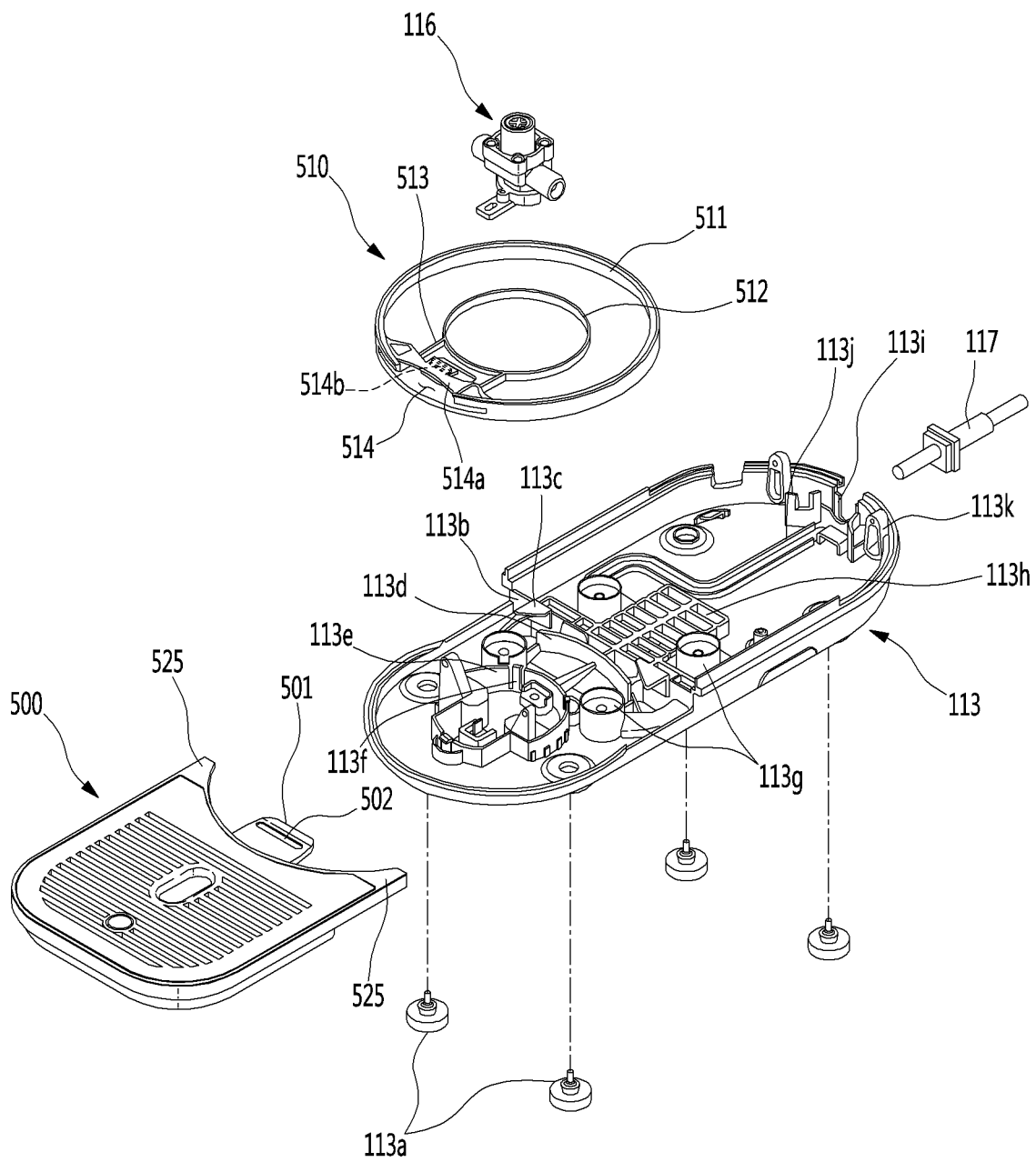
FIG. 23 is an exploded perspective view showing a coupling structure of the base and the tray.

FIG. 21 is a perspective view showing rotation of the tray of the water purifier. FIG. 22 is a perspective view showing the base of the water purifier. FIG. 23 is an exploded perspective view showing a coupling structure of the base and the tray.

The tray 500 protrudes forward from the front cover 111 and is coupled to the base 113. The tray 500 may be positioned right under the dispenser module 200. Further, the tray 500 can be rotated by a user and it may be separated from the base 113. The tray 500 may have a grill-shaped top to be able to keep water dropping from the dispenser module 200.

To this end, a rotary ring 510 is rotatably disposed on the base 113 and the tray 500 is detachably coupled to the rotary ring 510. Accordingly, the tray 500 can be rotated on the base 113. Further, if necessary, the tray 500 can be separated from the rotary ring 510. Further, the tray 500 protrudes forward from the base 113 when it is combined with the rotary ring 510.

The base 113 and the tray 500 are described in detail hereafter.

Referring to FIGS. 21 to 23, the base 113 forms the bottom of the water purifier 10. The edge of the base 113 extend upward so that the base 113 can be combined with the side panels 115, front cover 111, and rear cover 112.

The base 113 has a leg 113a protruding downward. A plurality of legs 113a may be formed on the base 113 to space the entire bottom of the base 113 from the floor. Accordingly, external air can easily flow inside through the bottom of the base 113.

The rotary ring 510 is rotatably disposed on the front section of the base 113. The tray 500 is separably coupled to the front of the rotary ring 510, so it can be rotated left and right together with the rotary ring 510.

In the base 113, the front section may be stepped to be lower than the rear section. A slit is formed between the front section of the base 113 and the lower end of the front cover 111, so the tray 500 can be rotated left and right together with the rotary ring 510, with the sides thereof exposed to the outside through the slit.

The stepped portion between the front section and the rear section of the base 113 functions as a stopper 113b that limits the rotational angle of the tray 500 when the tray 500 is rotated. When the tray 500 is rotated, both sides of the tray 500 come in contact with the stopper 113b, so the rotation of the tray 500 can be restricted.

Holders 113c that prevents vertical movement of the tray 500 extend forward from the stopper 113b of the base 113. The holders 113c can retain both sides of the rear end of the tray 500 that has been rotated.

A rotation guide is disposed inside the base 113. The rotation guide may be composed of a first rotation guide 113d and a second rotation guide 113e coaxially formed on the base 113. The first rotation guide 113d is positioned outside the second rotation guide 113e. The first rotation guide 113d and the second rotation guide 113e protrude upward with predetermined curvature from the base 113 and can guide the rotary ring 510 when the rotary ring 510 is rotated. The rotation guides 113d and 113e may be formed in a circular or arc shape.

The rotary ring 510 is guided by the rotation guides 113d and 113e to be rotatably disposed on the base 113 and to support the tray 500. The rotary ring 510 may be composed of an outer ring 511, an inner ring 512, and a ring bridge 513.

The outer ring 511 forms the outer frame and shape of the rotary ring 510. The outer ring 511 is formed in a circular shape and is disposed to be rotatable along the first guide 113d with at least a portion thereof in contact with the outer side of the first rotation guide 113d.

The inner ring 512 is coaxially disposed inside the outer ring 511. The inner ring 512 is formed in a circular shape and at least a portion of the inner ring 512 is in contact with the outer side of the second rotation guide 113e, so the inner ring 512 can be guide to rotate at the position by the second rotation guide 113e without moving forward/rearward with respect to the base 113.

A tray seat 514 is disposed at a side of the outer ring 511 to couple the tray 500. The tray seat 514 has a tray connector hole 514a having the same size and shape as a tray connector 501 of the tray 500. The tray connector hole 514a is open toward the tray connector 501, so the tray connector 501 is inserted into the tray seat 514 through the tray connector hole 514a.

When the tray connector 501 is inserted in the tray seat 514, the tray seat 514 covers the tray connector 501 and comes in contact with the outer side of the tray connector 501, thereby supporting tray connector 501 to prevent the tray connector 501 from moving in the up-down/left-right directions. However, the tray connector 501 can move forward/rearward in the tray seat 514, so it can be inserted and drawn out.

A protrusion 514b may be formed inside the tray seat 514. A fastening groove 502 is formed at the tray connector 501, so when the tray connector 501 is inserted into the tray seat 514, the protrusion 514b is fitted into the fastening groove 502 so that the tray 500 can be coupled to the rotary ring 510. Further, it is possible to easily know that the protrusion 514b and the fastening groove 502 are fitted to each other when the tray 500 is disposed. As the tray connector 501 is inserted in the tray seat 514, the tray 500 can be coupled to the rotary ring 510 and can be rotated left and right with respect to the base 113.

On the other hand, a retaining protrusion 113f is formed at the second rotation guide 113e, thereby preventing the rotary ring 510 from separating from the second rotation guide 113e. The upper end of the retaining protrusion 113f may be formed in a hook shape to be locked to the top of the inner ring 512. Accordingly, it is possible to prevent the rotary ring 510 from being lifted and separated from the second rotation guide 113e when the tray 500 is rotated, so the tray 500 can be stably rotated.

A reducing valve 116 may be disposed at the center of the front section of the base 113. The reducing valve 116 allows for smooth water purification and water pressure control when water is supplied, by controlling the pressure of the water supplied from a water supply. The reducing valve 116 is positioned inside inner ring 512 when the rotary ring 510 is disposed, so the space can be efficiently used.

Compressor mounts 113g where a compressor 141 is disposed are formed at the middle portion of the base 113. The compressor mounts 113g protrude upward to be able to support the compressor 141. Four compressor mounts 113g may be provided, so they can support four corners of the bottom of the compressor 141. Further, nuts are formed inside the compressor mounts 113g by insert injection in order to fix the compressor 141 by fastening screws from under the compressor mounts 113g after the compressor 141 is seated.

A suction grill 113h is further formed at the middle portion of the base 113. The suction grill 113h may be at least partially positioned between the compressor mounts 113g, under the compressor 141. Accordingly, air that is suctioned into the water purifier 10 can cool the compressor 141 by passing by the compressor 141. The suction grill 113h has a lattice shape with a plurality of suction holes, thereby preventing inflow of external foreign substances.

The condenser bracket 144 receiving the condenser 142 is disposed behind the suction grill 113h. The condenser bracket 144 is positioned on the rear section of the base 113. The condenser bracket 144 may be composed of the condenser mount 145 fixed on the base 113 and the tank mount 146 disposed on the condenser mount 145.

The cooling fan 143 is disposed on the front of the condenser mount 145. External air is suctioned through the suction grill 113h and is discharged through the outlet 112a after cooling the compressor 141 and the condenser 142 by the cooling fan 143. The rear side of the condenser mount 145 is in contact with the outlet 112a. Accordingly, the condenser 142 disposed inside the condenser mount 145 is positioned close to the outlet 112a of the water purifier 10.

A cord seat 113i where a power cord 117 is fixed is formed at the rear end of the base 113. A cord guide 113j is formed from the cord seat 113i to the middle portion of the base 113. Accordingly, the power cord 117 can be moved along the cord guide 113j and is connected to the control assembly 170.

A water intake tube hole 113k through which an water intake tube 191 passes is formed at the rear end of the base 113, so the water intake tube 191 connected to the water supply is inserted into the water purifier 10 through the water intake tube hole 113k. The end of the water intake tube 191 can extend to the reducing valve 116. A tube guide 118 for preventing the water intake tube 191 from folding may be further provided at a bending section of the water intake tube 191. The tube guide 118 is made of plastic and guides the water intake tube 191 such that the water intake tube 191 is not excessively bent or folded. The tube guide 118 may be further provided for the tubes through which purified water, cold water, and hot water flow.

The invention claimed is:

1. A liquid purifier comprising:
   a body including a housing, a filter provided in the housing, and a rotator seat protruding in a forward direction from the housing and having a prescribed curvature and a semicircular shape;
   a dispenser at least partially protruding in the forward direction from the body and having a nozzle that supplies liquid passed through the filter; and
   a tray provided under the nozzle,
   wherein the dispenser further includes:
      a rotator formed in a circular shape, rotatably provided at the rotator seat, and rotatable with respect to the body; and
      a lifter that includes a first case that is fixed to an outside of the rotator, has a space therein, and has a bottom that is open, and a second case that is coupled to the nozzle and provided to move vertically in the space of the first case to change a height of the nozzle,
   wherein a vertical position of the second case is variable, and vertical position of the first case and the rotator are fixed, and
   wherein the liquid purifier further comprises a hose that extends between an end inside the body and another end that is provided in the space of the first case and is connected to the nozzle.

2. The liquid purifier of claim 1, wherein the lifter includes:
   a resisting member provided at one or more of the first case or the second case to reduce a force that is applied to vertically move the second case.

3. The liquid purifier of claim 2, wherein the resisting member includes an oil damper.

4. The liquid purifier of claim 1, wherein a guide mechanism, which directs a movement of the second case such that the second case moves vertically, is provided at one or more of the first case or the second case.

5. The liquid purifier of claim 4, wherein the guide mechanism includes:
   a guide groove vertically formed at the first case; and
   a guide provided on the second case and fitted in the guide groove.

6. The liquid purifier of claim 5, wherein the guide is rotatably provided on the second case.

7. The liquid purifier of claim 6, wherein first gear teeth are formed on an interior of the guide groove and second gear teeth engaged with the first gear teeth are formed on an exterior of the guide.

8. The liquid purifier of claim 7, further comprising a resisting member provided at one or more of the first case or the second case to reduce a force that is applied to vertically move the second case,
   wherein the resisting member includes an oil damper, and the guide is fitted on a rotary shaft of the resisting member.

9. The liquid purifier of claim 1, wherein the first case and the second case are in line contact with each other.

10. The liquid purifier of claim 9, wherein one or more contact protrusions are formed at the first case or the second case in a lifting direction of the second case.

11. The liquid purifier of claim 1, wherein
    the first case has flanges extending outward from sides of a rear portion thereof, the second case has extensions formed in parallel with the flanges on sides of a rear portion thereof and bending protrusions extending forward from the extensions and having hooks at ends thereof, and the flanges are inserted in grooves provided between the extensions and the hooks.

12. The liquid purifier of claim 11, wherein one or more first contact protrusions are formed on one or more surfaces, which face the extensions, of the flanges in a lifting direction of the second case.

13. The liquid purifier of claim 11, wherein one or more second contact protrusions are formed on one or more surfaces, which face the flanges, of the hooks in a lifting direction of the second case.

14. The liquid purifier of claim 11, wherein slopes are formed in parallel with each other on rear sides of the flanges and front sides of the hooks.

15. The liquid purifier of claim 1, wherein handles protruding outward are formed at lower ends of sides of the second case, and handle seats that receive the handles are formed at lower ends of sides of the first case.

16. The liquid purifier of claim 15, wherein holding grooves are formed inside the handles.

17. The liquid purifier of claim 1, wherein the housing of the body further includes a base forming a bottom thereof, and the tray is rotatably coupled to the base.

18. The liquid purifier of claim 17, wherein the base further includes a rotary ring rotatably provided thereon, and the tray is separably coupled to the rotary ring and extends outward from the housing.

19. The liquid purifier of claim 1, wherein a dispenser button to initiate dispensing of liquid is provided on a top of the body or a top of the dispenser.

20. The liquid purifier of claim 1, wherein the body further includes: a base;
a top plate forming an external shape of a top thereof;
side panels connected to ends of the top plate and forming external shapes of sides thereof;
a front cover forming an external shape of a front side between the side panels and having an opening extending to front ends of the side panels; and
a filter bracket extending upward from the base to a height corresponding to the opening of the front cover and supporting the filter,
wherein the rotator is rotatably provided on an upper end of the filter bracket and is rotatable with respect to the filter bracket.

21. The liquid purifier of claim 20, further comprising:
a user interface module provided in a cover hole formed at a top plate over the rotator and having a dispenser button to initiate dispensing water;
base supports that extend inside the cover hole and support an outer side of the user interface module such that the user interface module is rotatably seated; and
a plurality of rotational couplers extending inside the cover hole from a bottom of the user interface module to be coupled to the rotator such that the user interface module is rotatable with the dispenser and the rotator when the dispenser and the rotator are rotated.

22. The liquid purifier of claim 20, wherein the front cover includes:
a lower cover extending from the base to a lower end of the opening to cover the filter bracket; and
an upper cover spaced from the lower cover, extending from an upper end of the opening to the top plate, and rotatably coupled to the upper end of the rotator.

23. The liquid purifier of claim 21, wherein the rotator includes:
a rotator housing having a cylindrical shape, coupled to the dispenser, and covering at least a portion of the opening;
a bottom guide bracket coupled to an open bottom of the rotator housing and rotatably supported on the filter bracket; and
a top guide bracket provided on an open top of the rotator housing and rotating with the user interface module.

24. The liquid purifier of claim 23, wherein center rings are formed at rotational centers of the top guide bracket and the bottom guide bracket,
a rotary pipe, which rotatably fitted to a connector coupled to the hose connected with the nozzle, is provided between the center rings, and
a plurality of coupling rings through which the rotational couplers pass are formed at the bottom guide bracket and the top guide bracket at sides of the center rings.

25. The liquid purifier of claim 24, wherein a rotary pipe to which the connector, a cooled liquid tube, and a purified liquid tube are fitted is coupled to the connector through the center rings, and
the rotary pipe is made of metal and has fitting grooves in which collets of the connector are inserted to rotatably couple the rotary pipe and the connector.

26. The liquid purifier of claim 21, wherein the base supports are inclined inward around the cover hole and support the bottom of the user interface module.

27. The liquid purifier of claim 21, wherein the user interface module is formed in a circular shape and a top of the user interface module has a slope inclined downward toward the dispenser.

28. The liquid purifier of claim 20, wherein the rotator is coupled to the filter bracket, and wherein the filter bracket further includes:
a tongue spaced downward from the rotator seat and provided on the base; and
a filter seat connecting the rotator seat and the tongue and forming a space to receive the filter.

29. The liquid purifier of claim 20, wherein an oil damper having a pinion on a rotary shaft thereof is provided on the rotator,
a curved internal gear is formed on the filter bracket, and the pinion is moved along the internal gear when the rotator is rotated.

* * * * *